US012802242B2

(12) United States Patent
Miyamae

(10) Patent No.: US 12,802,242 B2
(45) Date of Patent: Nov. 17, 2026

(54) INFORMATION PROCESSING APPARATUS, INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventor: Kyoko Miyamae, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 18/492,579

(22) Filed: Oct. 23, 2023

(65) Prior Publication Data

US 2024/0144493 A1 May 2, 2024

(30) Foreign Application Priority Data

Oct. 26, 2022 (JP) ................................ 2022-171319

(51) Int. Cl.

*G06T 7/292* (2017.01)
*G06T 7/00* (2017.01)
*G06T 7/70* (2017.01)

(52) U.S. Cl.

CPC ................ *G06T 7/292* (2017.01); *G06T 7/70* (2017.01); *G06T 7/97* (2017.01); *G06T 2207/10016* (2013.01)

(58) Field of Classification Search

CPC .. G06T 7/292; G06T 7/70; G06T 7/97; G06T 2207/10016; G06T 2207/30196; G06T 2207/30221

See application file for complete search history.

(56) References Cited

U.S. PATENT DOCUMENTS

| | | | | |
|---|---|---|---|---|
| 2012/0020524 | A1* | 1/2012 | Ishikawa | H04N 7/183 382/103 |
| 2018/0025498 | A1* | 1/2018 | Omari | G01C 21/1656 348/144 |
| 2020/0134842 | A1* | 4/2020 | Suk | G06T 7/248 |
| 2021/0295540 | A1* | 9/2021 | Sato | G06T 7/292 |
| 2022/0294986 | A1* | 9/2022 | Ha | H04N 23/45 |
| 2024/0056686 | A1* | 2/2024 | Tsunashima | H04N 23/667 |

FOREIGN PATENT DOCUMENTS

| | | | |
|---|---|---|---|
| JP | 2000101902 | A | 4/2000 |
| WO | 2022168481 | A1 | 8/2022 |

* cited by examiner

*Primary Examiner* — John B Strege
*Assistant Examiner* — Daniel C Chang
(74) *Attorney, Agent, or Firm* — Canon U.S.A., Inc., IP Division

(57) ABSTRACT

An information processing apparatus is provided and acquires a first image captured by a first image capturing apparatus which tracks a subject at a first speed and a second image captured by a second image capturing apparatus which tracks the subject at a second speed. The information processing apparatus outputs an image selected from the first image and the second image. The first speed is higher than the second speed, and the image to be output is switched according to a movement speed of the subject.

9 Claims, 22 Drawing Sheets

INFORMATION PROCESSING APPARATUS, INFORMATION PROCESSING SYSTEM, INFORMATION PROCESSING METHOD, AND STORAGE MEDIUM

BACKGROUND

Field

Aspects of the present disclosure generally relate to an information processing technique which is used to perform tracking image capturing of an image capturing object such as a subject.

Description of the Related Art

In, for example, lectures or sports, image delivery or recording using a plurality of cameras and a switcher is now quite common. Moreover, recently, automatic tracking image capturing aimed at cost reduction of, for example, labor cost has begun to be put into practical use. However, with regard to image capturing in a situation in which, as in sports, changes in the movement speed of a subject are drastic, there is an issue in which it is difficult to automatically perform smooth panning, tilting, and zooming control suitable for an image or video work. In the following description, panning is expressed by P, tilting is expressed by T, zooming is expressed by Z, and a set of panning, tilting, and zooming is expressed by PTZ. For example, if, in order to prevent a subject from being lost (from becoming unable to be followed), PTZ control is performed to a large degree as soon as a subject moves if only a little, an unnatural image which looks what is called jerky is obtained. Conversely, if, in order to perform image capturing of slow motion of a subject in a natural and smooth way, PTZ control is performed after the subject moves to some extent, rapid motion of the subject becomes unable to be handled, so that the subject may be lost.

On the other hand, Japanese Patent Application Laid-Open No. 2000-101902 discusses a technique which dynamically changes a tracking method by detecting a moving object serving as a monitoring target from a moving image signal obtained by a video camera to calculate position information about the moving object and using the previously detected position information and predicted future position information and thus enables performing image capturing without losing a subject.

However, with regard to the technique discussed in Japanese Patent Application Laid-Open No. 2000-101902, in a case where a subject has made unpredictable motion, such as making sudden motion or making sudden stop, the subject may be lost.

SUMMARY

Aspects of the present disclosure are generally directed to enabling smoothly tracking an image capturing object, such as a subject, and also enabling tracking the image capturing object without losing the image capturing object even if there is, for example, rapid motion or sudden stop of the image capturing object.

According to an aspect of the present disclosure, an information processing apparatus includes at least one memory storing instructions, and at least one processor that, upon execution of the stored instructions, configures the at least one processor to operate as an acquisition unit configured to acquire a first image captured by a first image capturing apparatus which tracks a subject at a first speed and a second image captured by a second image capturing apparatus which tracks the subject at a second speed; an output unit configured to output an image selected from the first image and the second image; and a switching unit configured to switch an image to be output by the output unit, wherein the first speed is higher than the second speed, and wherein the switching unit switches an image to be output by the output unit according to a movement speed of the subject.

Further features of the present disclosure will become apparent from the following description of exemplary embodiments with reference to the attached drawings.

DESCRIPTION OF THE EMBODIMENTS

Figure 1:
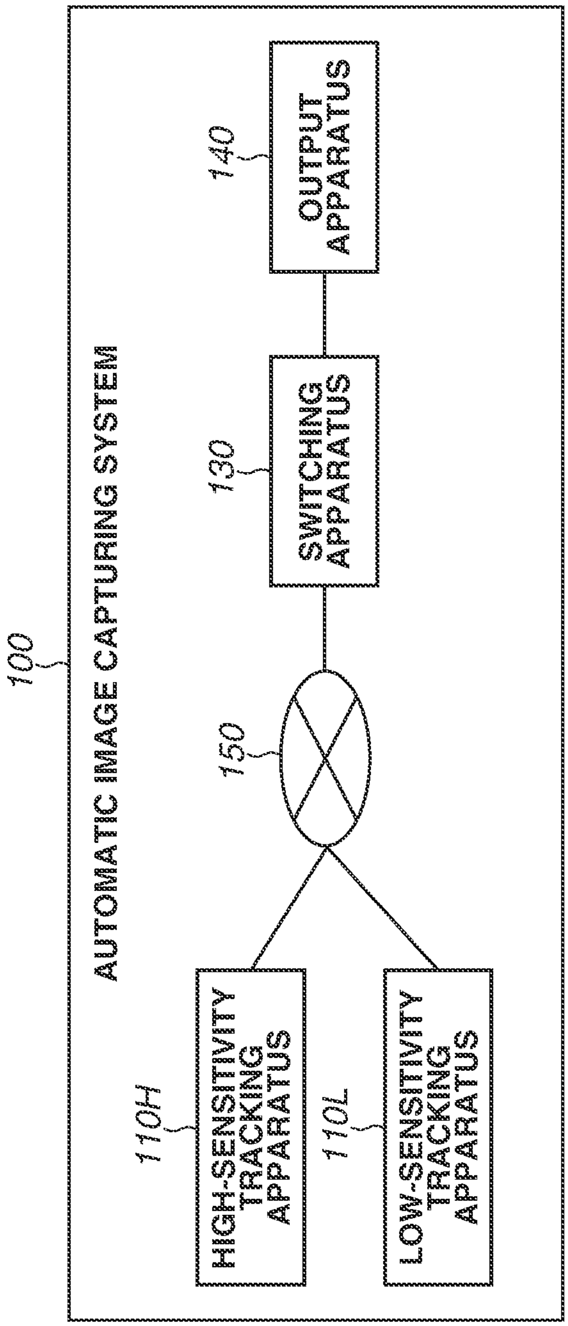
FIG. 1 is a diagram illustrating a configuration example of an automatic image capturing system according to a first exemplary embodiment.

Various exemplary embodiments, features, and aspects of the disclosure will be described in detail below with reference to the drawings. The following exemplary embodiments are not intended to limit the present disclosure, and not all of the combinations of features described in each exemplary embodiment are necessarily essential for solutions in the present disclosure. The configuration of each exemplary embodiment can be modified or altered as appropriate depending on specifications of apparatuses to which the present disclosure is applicable and various conditions (for example, use conditions or use environments). Moreover, some components of each exemplary embodiment described below can be configured in combination as appropriate.

An information processing apparatus in each exemplary embodiment is an apparatus which performs automatic tracking processing for tracking an image capturing object, such as a subject, from a moving image (hereinafter referred to simply as an "image") acquired by an image capturing apparatus, and tracks the same subject by performing at least two types of automatic tracking differing in tracking sensitivity. In the following description of each exemplary embodiment, an image capturing object serving as the same subject which is tracked by a tracking apparatus to which the information processing apparatus is applied is referred to as a "tracking target". Moreover, in each exemplary embodiment, parameters representing a tracking sensitivity include at least one of an interval for calculating the amount of movement and the speed of movement of a subject (tracking target), a threshold value for the amount of movement of a subject, and speed coefficients for varying an image capturing direction of the image capturing apparatus (camera) in tracking a subject. Moreover, in each exemplary embodiment, as the tracking sensitivity for use in automatically tracking the same subject (tracking target), at least two different tracking sensitivities, i.e., a first tracking sensitivity and a second tracking sensitivity, are set. The first tracking sensitivity is assumed to be a maximum sensitivity at which the tracking apparatus is able to track a subject. On the other hand, the second tracking sensitivity is assumed to be a tracking sensitivity lower than the first tracking sensitivity. In each exemplary embodiment, subject tracking which is performed by a first tracking apparatus set with the first tracking sensitivity is referred to as "high-sensitivity tracking", and subject tracking which is performed by a second tracking apparatus set with the second tracking sensitivity is referred to as "low-sensitivity tracking". In the high-sensitivity tracking using the first tracking sensitivity, automatic tracking processing is performed in such a way as to track a subject by performing panning, tilting, and zooming (PTZ) control to a large degree as soon as a subject moves if only a little. In the low-sensitivity tracking using the second tracking sensitivity, in order to smoothly tack slow motion of a subject, automatic tracking processing is performed in such a way as to track the subject with driving speeds for PTZ lowered in such a manner that PTZ control is performed after the subject moves to some extent. In a first exemplary embodiment and a second exemplary embodiment described below, the first tracking apparatus set with the first tracking sensitivity is referred to as a "high-sensitivity tracking apparatus for performing high-sensitivity tracking", and the second tracking apparatus set with the second tracking sensitivity is referred to as a "low-sensitivity tracking apparatus for performing low-sensitivity tracking". Then, the high-sensitivity tracking apparatus and the low-sensitivity tracking apparatus operate in such a way as to track the same subject while cooperating with each other. This enables an information processing apparatus in each exemplary embodiment to, even in a case where a subject has made unpredictable motion, such as making sudden motion or making sudden stop, output an image with natural motion, which is not an unnatural motion which looks jerky, without becoming unable to follow (without losing) the subject.

FIG. 1 is a diagram illustrating an outline configuration of an automatic image capturing system 100, which is an application example of an information processing apparatus according to a first exemplary embodiment.

As illustrated in FIG. 1, the automatic image capturing system 100 is configured to include a plurality of tracking apparatuses differing in tracking sensitivity (in the example illustrated in FIG. 1, a high-sensitivity tracking apparatus 110H and a low-sensitivity tracking apparatus 110L), a switching apparatus 130, and an output apparatus 140. The high-sensitivity tracking apparatus 110H, the low-sensitivity tracking apparatus 110L, and the switching apparatus 130 are connected to each other via a network 150.

The automatic image capturing system 100 is a system which performs automatic tracking image capturing of a subject (an image capturing object or a tracking target) such as a sport athlete with use of the high-sensitivity tracking apparatus 110H and the low-sensitivity tracking apparatus 110L differing in tracking sensitivity. Each of the high-sensitivity tracking apparatus 110H and the low-sensitivity tracking apparatus 110L is equipped with an image capturing apparatus, which is capable of changing an image capturing angle of view by zooming (Z) control and an electrically driven tripod head, which is capable of changing an image capturing direction (panning (P) or tilting (T) direction) of the image capturing apparatus.

Thus, each of the high-sensitivity tracking apparatus 110H and the low-sensitivity tracking apparatus 110L is configured to be able to perform panning, tilting, and zooming (PTZ) control. Furthermore, in FIG. 1, the image capturing apparatus and the tripod head are omitted from illustration. Moreover, the image capturing apparatus is supposed to be, for example, an Internet Protocol (IP) camera connected to a network.

The high-sensitivity tracking apparatus 110H is an automatic tracking apparatus the tracking sensitivity of which for use in tracking a subject is set to a first tracking sensitivity which is a maximum sensitivity at which the tracking apparatus is able to track a subject (in the first exemplary embodiment, being referred to as "high sensitivity"). The high-sensitivity tracking apparatus 110H performs image capturing for a moving image (video) while, based on the position and motion of a subject the image capturing of which is being performed by the image capturing apparatus, automatically tracking the subject at a high-sensitivity tracking sensitivity. Moreover, although details are described below, the high-sensitivity tracking apparatus 110H in the first exemplary embodiment performs an image switching determination as to whether to switch an output which the switching apparatus 130 outputs, based on the movement speed of a subject. Then, the high-sensitivity tracking apparatus 110H transmits, to the switching apparatus 130 via the network 150, both image information obtained by performing image capturing while tracking a subject by high-sensitivity tracking and image switching information that is based on a result of the image switching determination. Moreover, the high-sensitivity tracking apparatus 110H in the first exemplary embodiment transmits, to the low-sensitivity tracking apparatus 110L, information indicating the position and motion of a subject the image capturing of which is being performed by the image capturing apparatus. Details of, for example, the configuration of the high-sensitivity tracking apparatus 110H, the tracking sensitivity setting (high-sensitivity setting), the image switching determination, the image switching information, and the information indicating the position and motion of a subject are described below.

The low-sensitivity tracking apparatus 110L is an automatic tracking apparatus the tracking sensitivity of which for use in tracking a subject is set to a second tracking sensitivity (in the first exemplary embodiment, being referred to as "low sensitivity") lower than the first tracking sensitivity, which is set to the high-sensitivity tracking apparatus 110H. The low-sensitivity tracking apparatus 110L performs image capturing for a moving image (video) while, based on the position and motion of a subject the image capturing of which is being performed by the image capturing apparatus or information indicating the position and motion of a subject input from the high-sensitivity tracking apparatus 110H, automatically tracking the subject at a low-sensitivity tracking sensitivity. Then, the low-sensitivity tracking apparatus 110L transmits, to the switching apparatus 130 via the network 150, image information obtained by performing image capturing while tracking the subject by low-sensitivity tracking. Details of, for example, the configuration of the low-sensitivity tracking apparatus 110L and the tracking sensitivity setting (low-sensitivity setting) are described below.

The switching apparatus 130 selects one of pieces of image information respectively transmitted from the high-sensitivity tracking apparatus 110H and the low-sensitivity tracking apparatus 110L via the network 150, based on the image switching information transmitted from the high-sensitivity tracking apparatus 110H, and outputs the selected image information to the output apparatus 140. Details of, for example, the configuration of the switching apparatus 130 and the image selection that is based on the image switching information are described below.

The output apparatus 140, for example, displays the image information input from the switching apparatus 130. Furthermore, the output apparatus 140 is also able to record the image information input from the switching apparatus 130.

In the following description, tracking sensitivity setting (high-sensitivity setting) in the high-sensitivity tracking apparatus 110H and tracking sensitivity setting (low-sensitivity setting) in the low-sensitivity tracking apparatus 110L are described.

In each of the high-sensitivity tracking apparatus 110H and the low-sensitivity tracking apparatus 110L, as parameters representing tracking sensitivity setting therefor, an interval of calculation of the movement amount and movement speed of a subject, a threshold value for the movement amount of a subject, and speed coefficients for varying an image capturing direction of the image capturing apparatus in tracking a subject are set. In the first exemplary embodiment, the interval of calculation of the movement amount and movement speed of a subject is referred to as a "movement amount calculation interval M", the threshold value for the movement amount of a subject is referred to as a "movement amount threshold value T", and the speed coefficients for varying an image capturing direction are referred to as "PT speed coefficients S(x, y)". In the first exemplary embodiment, the movement amount calculation interval M is a time interval represented by the number of frames of a moving image.

Here, in tracking sensitivity setting for the high-sensitivity tracking apparatus 110H, the movement amount calculation interval M (the number of frames) is denoted as $M_H$, the movement amount threshold value T is denoted as $T_H$, and the PT speed coefficients S(x, y) are denoted as $S_H(p, t)$. The high-sensitivity tracking apparatus 110H calculates a subject movement amount at intervals of the number of frames $M_H$, which is the movement amount calculation interval $M_H$, and, in a case where the subject movement amount has exceeded the movement amount threshold value $T_H$, the high-sensitivity tracking apparatus 110H performs PT control with the PT speed coefficients $S_H(p, t)$ to track a subject.

On the other hand, in tracking sensitivity setting for the low-sensitivity tracking apparatus 110L, the movement amount calculation interval M (the number of frames) is denoted as $M_L$, the movement amount threshold value T is denoted as $T_L$, and the PT speed coefficients S(x, y) are denoted as $S_L(p, t)$. Moreover, in the first exemplary embodiment, the maximum speed of subject speeds at which the low-sensitivity tracking apparatus 110L is able to perform tracking by low-sensitivity tracking is referred to as a "trackable speed $S_R$". The low-sensitivity tracking apparatus 110L calculates a subject movement amount at intervals of the number of frames $M_L$, which is the movement amount calculation interval $M_L$, and, in a case where the subject movement amount has exceeded the movement amount threshold value $T_L$, the low-sensitivity tracking apparatus 110L performs PT control with the PT speed coefficients $S_L(p, t)$ to track a subject.

Moreover, in the first exemplary embodiment, the movement amount calculation interval $M_H$, the movement amount threshold value $T_H$, and the PT speed coefficients $S_H(p, t)$ and the movement amount calculation interval $M_L$, the movement amount threshold value $T_L$, and the PT speed coefficients $S_L(p, t)$ have relationships expressed by the following formulae (1) to (3):

$$M_H<M_L \quad (1),$$

$$T_H<T_L \quad (2), \text{ and}$$

$$S_H(p,t)>S_L(p,t) \quad (3).$$

Thus, the high-sensitivity tracking apparatus 110H checks the motion of a subject at a movement amount calculation interval shorter than that for the low-sensitivity tracking apparatus 110L, and also performs PT control with PT speed coefficients higher than those for the low-sensitivity tracking apparatus 110L. Accordingly, the high-sensitivity tracking apparatus 110H is able to perform image capturing while tracking a quick motion of the subject without missing it, as compared with the low-sensitivity tracking apparatus 110L. On the other hand, the low-sensitivity tracking apparatus 110L is able to perform image capturing while smoothly tracking a motion of the subject which is slower than that for the high-sensitivity tracking apparatus 110H.

In this way, the high-sensitivity tracking apparatus 110H and the low-sensitivity tracking apparatus 110L in the first exemplary embodiment track the same subject by respective tracking sensitivity settings including respectively different movement amount calculation intervals M, movement amount threshold values T, and PT speed coefficients S(x, y). Then, the automatic image capturing system 100 in the first exemplary embodiment causes the switching apparatus 130 to perform switching as appropriate to select any one of an image obtained by the high-sensitivity tracking apparatus 110H performing tracking image capturing of the same subject and an image by the low-sensitivity tracking apparatus 110L performing tracking image capturing of the same subject, and outputs the selected image. In the case of the first exemplary embodiment, as described below, the switching apparatus 130 performs switching of an image to be output, based on image switching information obtained as a result of image switching determination processing using the movement speed of a subject calculated by the high-sensitivity tracking apparatus 110H.

Furthermore, although omitted from illustration in FIG. 1, each of image capturing apparatuses respectively connected to the high-sensitivity tracking apparatus 110H and the low-sensitivity tracking apparatus 110L generates a moving image by performing image capturing of an image capturing area in a real space. The image capturing apparatus converts light into a digital signal with use of an image sensor, such as a charge-coupled device (CCD) sensor or a complementary metal-oxide semiconductor (CMOS) sensor.

Similarly, although omitted from illustration in FIG. 1, each of electrically driven tripod heads respectively connected to the high-sensitivity tracking apparatus 110H and the low-sensitivity tracking apparatus 110L is configured to be able to change the image capturing direction of the image capturing apparatus by PT driving.

Moreover, while, in FIG. 1, an example in which a set including the high-sensitivity tracking apparatus 110H and the low-sensitivity tracking apparatus 110L tracks the same subject is illustrated, a plurality of sets each including a high-sensitivity tracking apparatus and a low-sensitivity tracking apparatus can be prepared. Then, the plurality of sets each including a high-sensitivity tracking apparatus and a low-sensitivity tracking apparatus can be configured to track respective different tracking targets (the tracking target for each set being the same subject).

Figure 2:
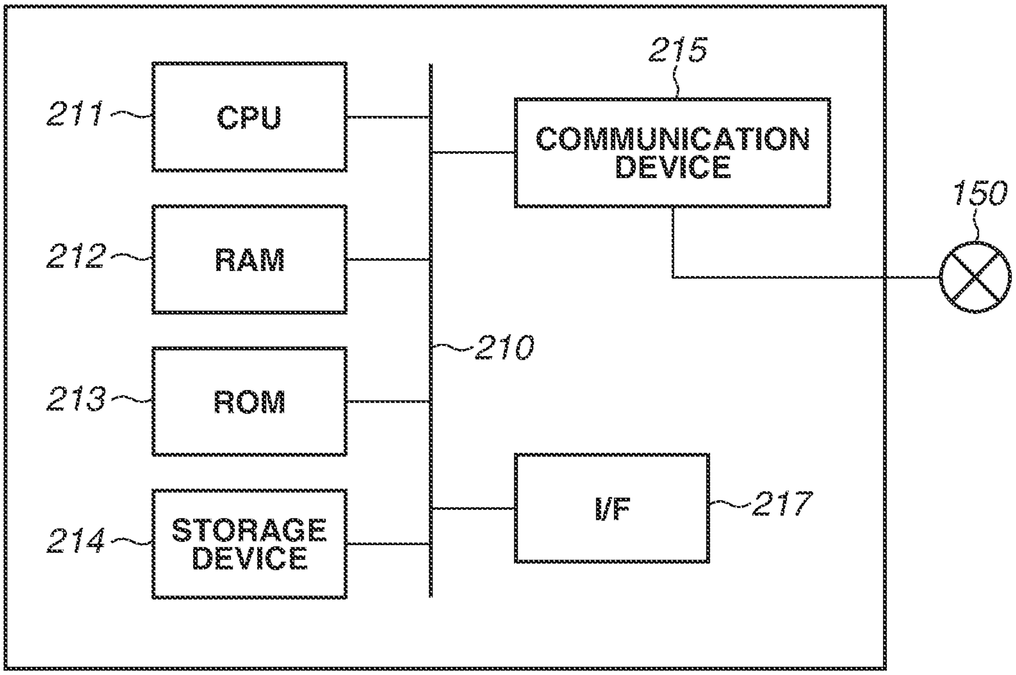
FIG. 2 is a diagram illustrating a hardware configuration example of an information processing apparatus according to each exemplary embodiment.

FIG. 2 is a diagram illustrating an example of a hardware configuration which is applicable to an information processing apparatus according to the first exemplary embodiment, such as each of the high-sensitivity tracking apparatus 110H and the low-sensitivity tracking apparatus 110L or the switching apparatus 130 illustrated in FIG. 1.

The configuration illustrated in FIG. 2 includes a central processing unit (CPU) 211, a random access memory (RAM) 212, a read-only memory (ROM) 213, a storage device 214, a communication device 215, and an interface (I/F) 217. These constituent components are connected to each other via a system bus 210. Furthermore, these constituent components are merely examples.

The CPU 211 is a device which performs, for example, control of each internal constituent component, calculation and modification of data, image processing, and computation processing. The RAM 212 is a volatile memory and is used as a main memory for the CPU 211 and a temporary storage region of, for example, a work area. The ROM 213 is a non-volatile memory, in which, for example, image data, other pieces of data, and various programs for causing the CPU 211 to run are stored in respective predetermined regions. The CPU 211 performs control of various constituent components and various information processing operations using the RAM 212 as a work memory according to programs stored in, for example, the ROM 213. Furthermore, the programs for causing the CPU 211 to run can be stored in the storage device 214.

The storage device 214 includes, for example, a hard disk drive (HDD) or a solid state drive (SSD). The storage device 214 is able to perform reading-out and writing of data under the control of the CPU 211. Furthermore, the storage device 214 can be used instead of the RAM 212 or the ROM 213.

The communication device 215 performs communication via the network 150 under the control of the CPU 211.

In a case where the configuration illustrated in FIG. 2 is a hardware configuration for implementing each of the high-sensitivity tracking apparatus 110H and the low-sensitivity tracking apparatus 110L illustrated in FIG. 1, the I/F 217 is connected to the image capturing apparatus (not illustrated) such as a camera and the electrically driven tripod head (not illustrated). The CPU 211 in this case performs control of an image capturing operation, a zooming operation, a focus value, and an aperture value of the image capturing apparatus connected via the I/F 217, and also performs, for example, control of PT driving in the electrically driven tripod head.

On the other hand, in a case where the configuration illustrated in FIG. 2 is a hardware configuration for implementing the switching apparatus 130 illustrated in FIG. 1, the I/F 217 is connected to the output apparatus 140. The CPU 211 in this case selects any one of pieces of image information respectively transmitted from the high-sensitivity tracking apparatus 110H and the low-sensitivity tracking apparatus 110L via the network 150, based on the image switching information, and outputs the selected image information to the output apparatus 140.

Figure 3:
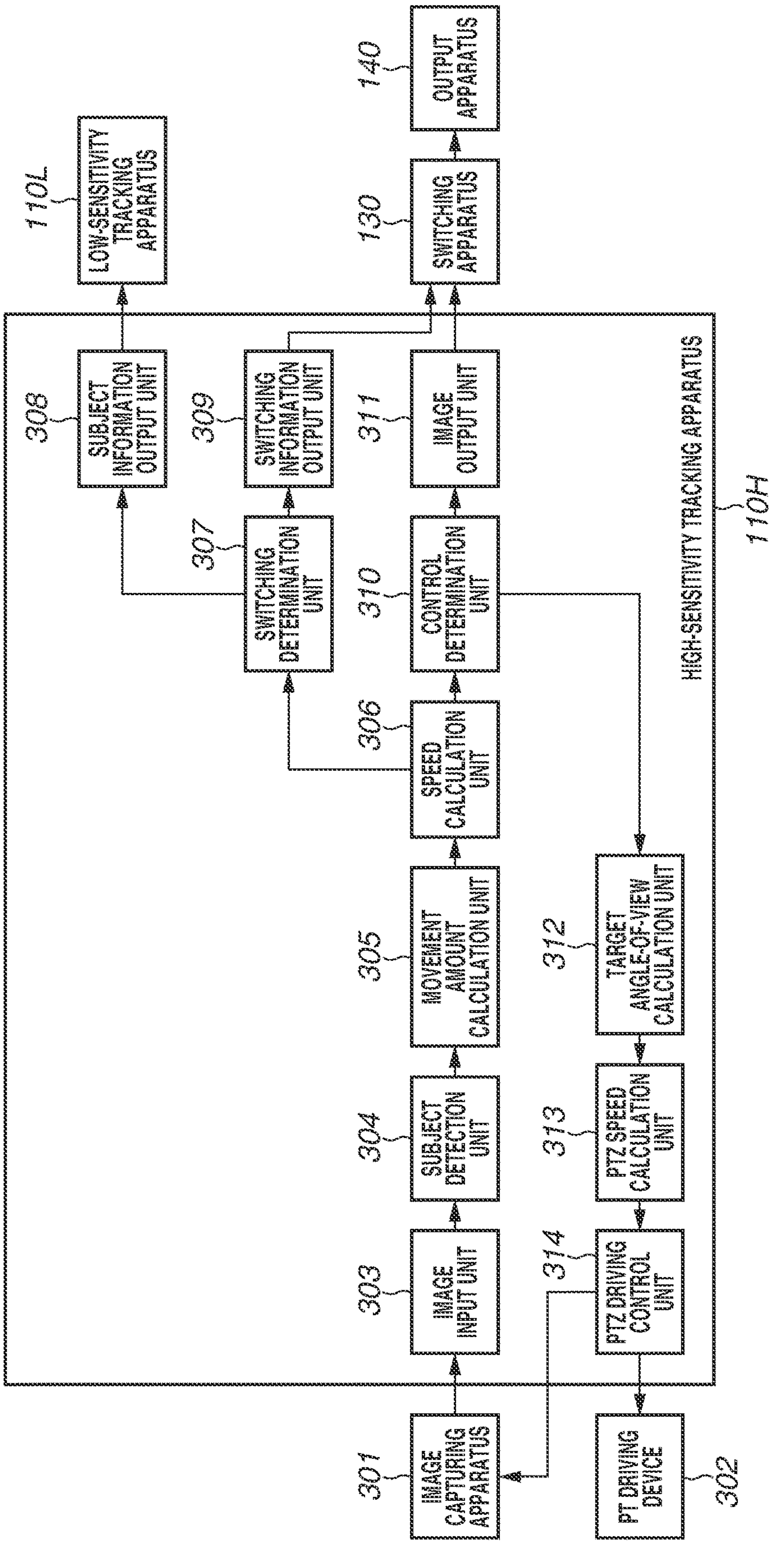
FIG. 3 is a diagram illustrating a configuration example of a high-sensitivity tracking apparatus in the first exemplary embodiment.
Figure 4:
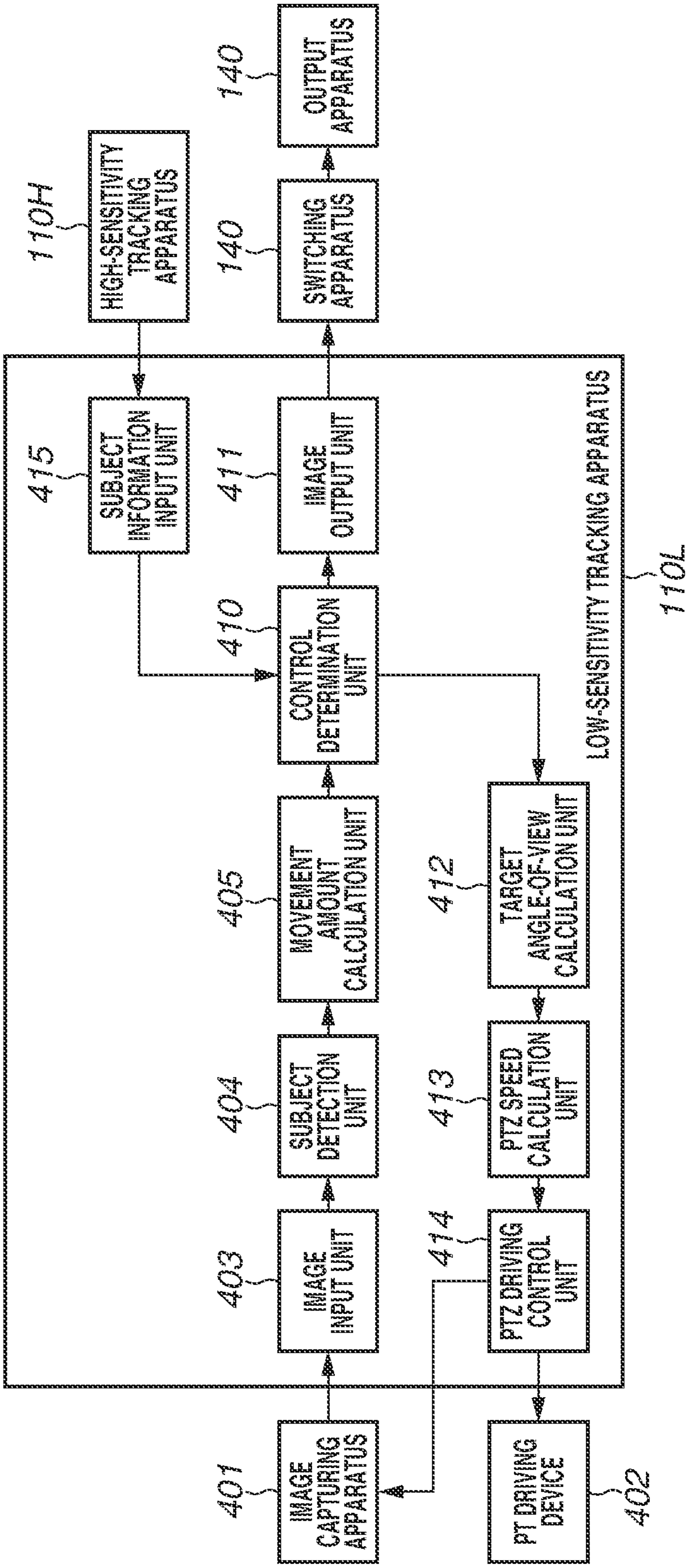
FIG. 4 is a diagram illustrating a configuration example of a low-sensitivity tracking apparatus in the first exemplary embodiment.
Figure 5:
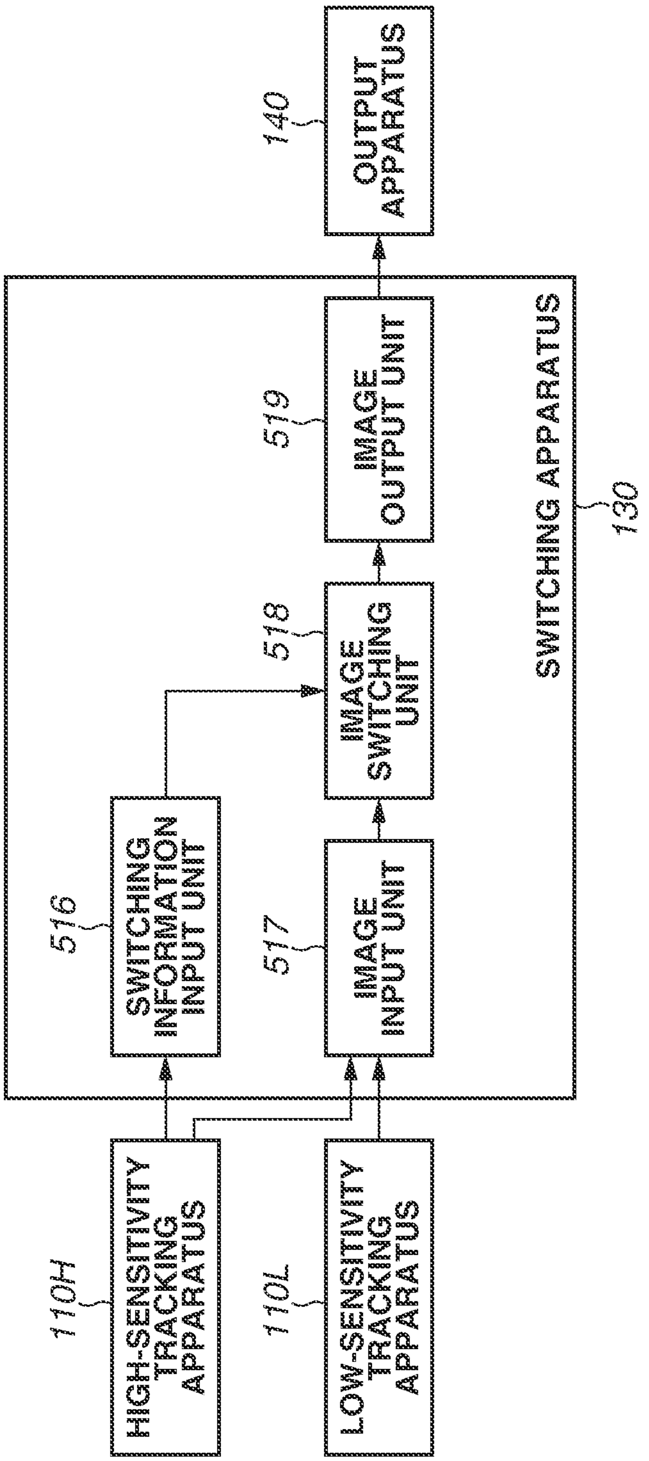
FIG. 5 is a diagram illustrating a configuration example of a switching apparatus in the first exemplary embodiment.

FIG. 3 to FIG. 5 are functional block diagrams illustrating, for example, various functional units which are configured by, for example, the CPU 211 illustrated in FIG. 2 executing an information processing program (automatic tracking image capturing control program) in the first exemplary embodiment.

FIG. 3 is a diagram illustrating a functional configuration of the high-sensitivity tracking apparatus 110H, FIG. 4 is a diagram illustrating a functional configuration of the low-sensitivity tracking apparatus 110L, and FIG. 5 is a diagram illustrating a functional configuration of the switching apparatus 130. Furthermore, while, in the first exemplary embodiment, the respective functional units illustrated in FIG. 3 to FIG. 5 are assumed to be functional units which are configured by the CPU 211 executing the automatic tracking image capturing control program in the first exemplary embodiment, a part or the whole of the respective functional units illustrated in FIG. 3 to FIG. 5 can be implemented as a dedicated hardware circuit.

Moreover, while, in the examples illustrated in FIG. 3 to FIG. 5, the high-sensitivity tracking apparatus 110H, the low-sensitivity tracking apparatus 110L, and the switching apparatus 130 have respective different configurations and are connected to each other via the network 150, these apparatuses can be integrated into one apparatus configuration. In the case of the integration into one apparatus configuration, a set including an image capturing apparatus and a PT driving device described below is provided as, for example, a set including an image capturing apparatus for high-sensitivity tracking and a PT driving device or a set including an image capturing apparatus for low-sensitivity tracking and a PT driving device. Then, such a plurality of sets each including an image capturing apparatus and a PT driving device and the output apparatus 140 are connected to the one apparatus concerned via, for example, a network. Furthermore, in the case of an information processing apparatus serving as one apparatus configuration, the above-mentioned hardware configuration illustrated in FIG. 2 is also applicable.

First, a functional configuration of the high-sensitivity tracking apparatus 110H illustrated in FIG. 3 is described.

Furthermore, in FIG. 3, as other apparatuses, for example, connected to the high-sensitivity tracking apparatus 110H, an image capturing apparatus 301, a PT driving device 302, the low-sensitivity tracking apparatus 110L, the switching apparatus 130, and the output apparatus 140 are also illustrated. The network 150 is omitted from illustration.

The image capturing apparatus 301 is an apparatus (camera) which performs image capturing of anything around the apparatus to generate an image. In the image capturing apparatus 301, an image capturing operation, a zooming operation, and control of a focus value and an aperture value are performed according to an image capturing control command input from the high-sensitivity tracking apparatus 110H. Then, the image capturing apparatus 301 outputs image information (video information) about a moving image acquired by image capturing to the high-sensitivity tracking apparatus 110H.

The PT driving device 302 is a device included in the electrically driven tripod head and performs a PT operation based on a PT control command input from the high-sensitivity tracking apparatus 110H. Since the image capturing apparatus 301 is arranged on the electrically driven tripod head, the image capturing direction (panning direction or tilting direction) of the image capturing apparatus 301 is changed by the PT operation of the PT driving device 302.

An image input unit 303 included in the high-sensitivity tracking apparatus 110H receives, as an input, image information about a moving image acquired by the image capturing apparatus 301 performing image capturing. The high-sensitivity tracking apparatus 110H performs processing operations using the following constituent components based on the image information input to the image input unit 303. Thus, the high-sensitivity tracking apparatus 110H analyzes the input image information at high-sensitivity tracking sensitivity and performs automatic tracking by PTZ control that is based on a result of the analysis, thus implementing automatic tracking image capturing of a subject. Moreover, the high-sensitivity tracking apparatus 110H performs an image switching determination based on the movement speed of a subject. Then, the high-sensitivity tracking apparatus 110H outputs, to the switching apparatus 130, image information obtained by performing image capturing of a subject while tracking the subject by high-sensitivity tracking and image switching information obtained by the image switching determination. Moreover, the high-sensitivity tracking apparatus 110H outputs, to the low-sensitivity tracking apparatus 110L, subject information which is information indicating the position and motion of a subject the image capturing of which is being performed by the image capturing apparatus 301. Details of the subject information are described below.

The image input unit 303 outputs, to a subject detection unit 304, image information received from the image capturing apparatus 301.

The subject detection unit 304 analyzes the image information input from the image input unit 303 to detect a subject serving as a tracking target and calculates subject position information representing the positional coordinates of the detected subject. Then, the subject detection unit 304 outputs, to a movement amount calculation unit 305, the calculated subject position information and the image information input from the image input unit 303.

The movement amount calculation unit 305 determines whether the number of frames of the input image information is greater than the movement amount calculation interval $M_H$. If it is determined that the number of frames of the input image information is greater than the movement amount calculation interval $M_H$, the movement amount calculation unit 305 calculates the movement amount of a subject relative to a target acquisition position based on the subject position information and target acquisition position information described below. The target acquisition position is a target position which is set to acquire the subject concerned by subject automatic tracking, and, in the case of the first exemplary embodiment, the target acquisition position is set as the position of the center of an image plane of the image capturing apparatus 301.

The method of calculating the subject movement amount in the movement amount calculation unit 305 is described with reference to FIG. 6.

Figure 6:
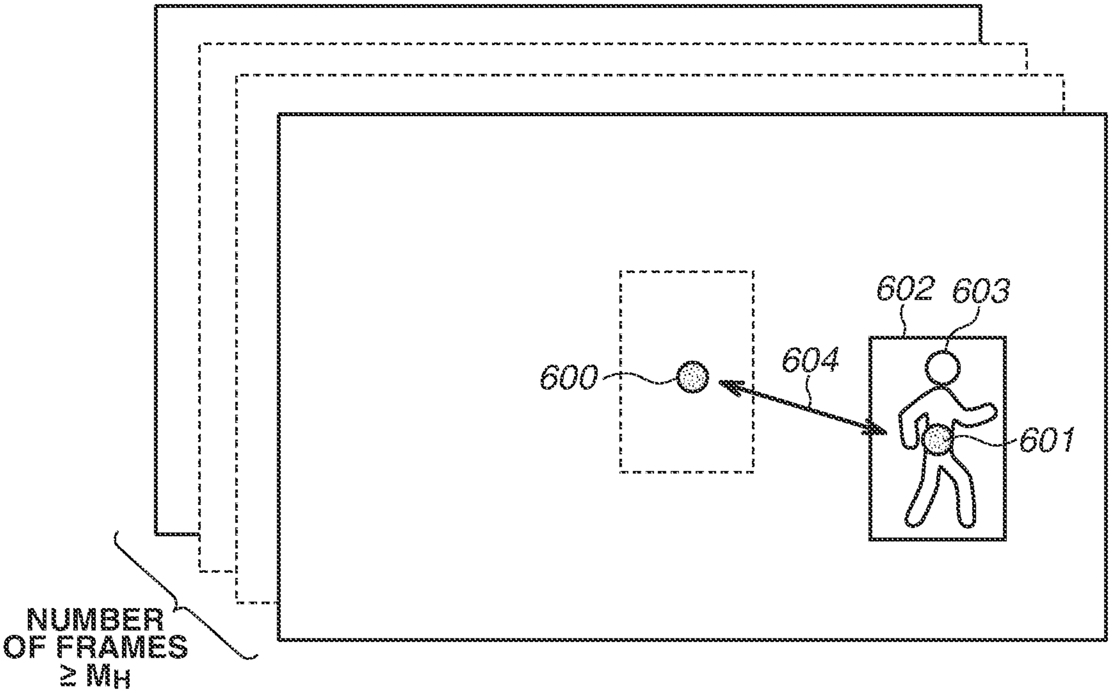
FIG. 6 is a diagram used to explain movement amount calculation processing for a subject.

As illustrated in FIG. 6, in the case of the first exemplary embodiment, a target acquisition position 600 which is set to automatically track a subject is assumed to be the center of an image plane. Here, the subject detection unit 304 treats the detected subject 603 as a subject detection frame 602, and sets the center position of the subject detection frame 602 as a subject center position 601 representing the center of the subject 603. In a case where the number of frames of the input image information is greater than the movement amount calculation interval $M_H$, the movement amount calculation unit 305 calculates a distance 604 between the target acquisition position 600 and the subject center position 601 as a subject movement amount.

Then, the movement amount calculation unit 305 outputs, to a speed calculation unit 306, information about the calculated subject movement amount and the subject position information and image information input from the subject detection unit 304.

The speed calculation unit 306 calculates the movement speed of a subject (hereinafter referred to as a "subject speed") with use of subject position information input at the present time and last-time subject position information calculated by the subject detection unit 304 before the present time. Moreover, the speed calculation unit 306 stores subject position information input at the present time as last-time subject position information which is used for subject speed calculation processing for next time.

Then, the speed calculation unit 306 outputs, to a switching determination unit 307, the calculated subject speed information and the subject position information input from the movement amount calculation unit 305. Moreover, the speed calculation unit 306 outputs, to a control determination unit 310, the calculated subject speed information and the subject position information and image information input from the movement amount calculation unit 305.

The switching determination unit 307 determines, based on the subject speed information input from the speed calculation unit 306, which of an image obtained by the high-sensitivity tracking apparatus 110H using high-sensitivity automatic tracking and an image obtained by the low-sensitivity tracking apparatus 110L using low-sensitivity automatic tracking to output (select).

Specifically, the switching determination unit 307 determines whether the subject speed is lower than or equal to the trackable speed in the low-sensitivity tracking apparatus 110L (lower than or equal to $S_R$) and, if it is determined that the subject speed is lower than or equal to the trackable speed $S_R$, the switching determination unit 307 determines to output (select) an image obtained by the low-sensitivity tracking apparatus 110L using low-sensitivity automatic tracking. Then, as information indicating a result of the determination, the switching determination unit 307 outputs, to a switching information output unit 309, image switching information for issuing an instruction for switching to outputting of an image obtained by low-sensitivity tracking. On the other hand, if it is determined that the subject speed is higher than the trackable speed $S_R$, the switching determination unit 307 determines to output (select) an image obtained by the high-sensitivity tracking apparatus 110H using high-sensitivity automatic tracking. Then, as information indicating a result of the determination, the switching determination unit 307 outputs, to the switching information output unit 309, image switching information for issuing an instruction for switching to outputting of an image obtained by high-sensitivity tracking.

Moreover, the switching determination unit 307 outputs, to a subject information output unit 308, the subject speed information and subject position information input from the speed calculation unit 306 as subject information representing the position and motion of a subject. In the following description, the subject speed information and subject position information, i.e., subject information representing the position and motion of a subject, is referred to as "subject information (position and speed)".

The subject information output unit 308 transmits, to the low-sensitivity tracking apparatus 110L via the network 150, the subject information (position and speed) input from the switching determination unit 307.

Moreover, the switching information output unit 309 outputs, to the switching apparatus 130 via the network 150, the image switching information input from the switching determination unit 307.

The control determination unit 310 outputs the input image information to an image output unit 311. Then, upon receiving image information, the image output unit 311 outputs the image information to the switching apparatus 130 via the network 150.

Moreover, the control determination unit 310 determines whether to perform PTZ control, based on the input subject movement amount information and the previously set movement amount threshold value $T_H$. If the subject movement amount is greater than the movement amount threshold value $T_H$, the control determination unit 310 determines to perform PTZ control and outputs the subject speed information and subject position information (i.e., the subject information (position and speed)) and the subject movement amount information to a target angle-of-view calculation unit 312. On the other hand, if the subject movement amount is less than or equal to the movement amount threshold value $T_H$, the control determination unit 310 determines not to perform PTZ control. Furthermore, in a case where no subject has been detected by the subject detection unit 304, the control determination unit 310 determines to perform zoom-out control and thus outputs a zoom-out command to the target angle-of-view calculation unit 312.

The target angle-of-view calculation unit 312 calculates a target image capturing direction and angle of view based on information about the above-mentioned target acquisition position and the subject information (position and speed) input from the control determination unit 310. In the case of the first exemplary embodiment, the target image capturing direction and angle of view are assumed to be an image capturing direction and angle of view for causing the subject position to coincide with the target acquisition position. The target angle-of-view calculation unit 312 outputs the calculated target image capturing direction and angle of view information, the subject movement amount information, and the subject information (position and speed) to a PTZ speed calculation unit 313.

The PTZ speed calculation unit 313 calculates speeds of PT driving (hereinafter referred to as "PT speeds") based on the subject movement amount information and the subject information (position and speed).

Here, when the subject speeds are denoted as X(p, t), PT driving speeds $P_H(p, t)$ are expressed by the following formula (4) using speed coefficients $S_H(p, t)$:

$$P_H(p,t)=S_H(p,t)\times X(p,t) \quad (4).$$

Furthermore, while, in the first exemplary embodiment, the PT speeds are calculated with use of the subject speeds X(p, t) and the speed coefficients $S_H(p, t)$, for example, previously determined fixed values can be used as the PT speeds, or PT speeds corresponding to the subject speeds can be read out from a preliminarily prepared speed table and be used as the above-mentioned PT speeds.

Moreover, with regard to a zooming driving speed (Z driving speed), the PTZ speed calculation unit 313 uses a zoom-out driving speed for a case where no subject has been detected by the subject detection unit 304 and a zoom-out command has been output from the control determination unit 310.

Then, the PTZ speed calculation unit 313 outputs the calculated PT speed information, target image capturing direction, and angle-of-view information to a PTZ driving control unit 314.

The PTZ driving control unit 314 generates a PT control command and a zooming control command based on the input image capturing direction, angle-of-view information, and PT speed information. Then, the PT control command is output to the PT driving device 302, and the zooming control command is output to the image capturing apparatus 301.

The PT driving device 302 performs PT driving of the electrically driven tripod head based on the input PT control command. The image capturing apparatus 301 performs zooming driving based on the input zooming control command.

Next, a functional configuration of the low-sensitivity tracking apparatus 110L illustrated in FIG. 4 is described.

Furthermore, in FIG. 4, as other apparatuses, for example, connected to the low-sensitivity tracking apparatus 110L, an image capturing apparatus 401, a PT driving device 402, the high-sensitivity tracking apparatus 110H, the switching apparatus 130, and the output apparatus 140 are also illustrated. The network 150 is omitted from illustration.

The image capturing apparatus 401 is an apparatus (camera) which performs image capturing of anything around the apparatus to generate an image. In the image capturing apparatus 401, an image capturing operation, a zooming operation, and control of a focus value and an aperture value are performed according to an image capturing control command input from the low-sensitivity tracking apparatus 110L. Then, the image capturing apparatus 401 outputs image information about a moving image acquired by image capturing to the low-sensitivity tracking apparatus 110L.

The PT driving device 402 is a device included in the electrically driven tripod head and performs a PT operation based on a PT control command input from the low-sensitivity tracking apparatus 110L. Since the image capturing apparatus 401 is arranged on the electrically driven tripod head, the image capturing direction (panning direction or tilting direction) of the image capturing apparatus 401 is changed by the PT operation of the PT driving device 402.

An image input unit 403 included in the low-sensitivity tracking apparatus 110L receives, as an input, image information about a moving image acquired by the image capturing apparatus 401 performing image capturing. The low-sensitivity tracking apparatus 110L performs processing operations using the following constituent components based on the image information input to the image input unit 403. The low-sensitivity tracking apparatus 110L in the first exemplary embodiment analyzes the input image information at low-sensitivity tracking sensitivity and thus acquires the position and motion of a subject in a way similar to the above-described way. Then, the low-sensitivity tracking apparatus 110L performs automatic tracking by PTZ control based on information representing the position and motion of a subject obtained by the low-sensitivity tracking or subject information (position and speed) input from the high-sensitivity tracking apparatus 110H, thus implementing automatic tracking image capturing of the subject.

Furthermore, the image input unit 403, a subject detection unit 404, an image output unit 411, and a PTZ driving control unit 414 included in the low-sensitivity tracking apparatus 110L are similar to the image input unit 303, the subject detection unit 304, the image output unit 311, and the PTZ driving control unit 314 described above, respectively, and are, therefore, omitted from description.

A movement amount calculation unit 405 determines whether the number of frames of the input image information is greater than the movement amount calculation interval $M_L$. If it is determined that the number of frames of the input image information is greater than the movement amount calculation interval $M_L$, the movement amount calculation unit 405 calculates the movement amount of a subject relative to a target acquisition position based on subject position information and target acquisition position information. The target acquisition position is a target position which is set to acquire the subject concerned by subject automatic tracking as with the above description, and is set as the position of the center of an image plane of the image capturing apparatus 401. The method of calculating the subject movement amount in the movement amount calculation unit 405 is similar to that described above with reference to FIG. 6.

Then, the movement amount calculation unit 405 outputs, to a control determination unit 410, the calculated subject movement amount information and the subject position information and image information input from the subject detection unit 404.

When subject information (position and speed) has been transmitted from the subject information output unit 308 of the high-sensitivity tracking apparatus 110H, a subject information input unit 415 receives the subject information (position and speed) and then outputs the subject information (position and speed) to the control determination unit 410. In the following description, the subject information (position and speed) transmitted from the high-sensitivity tracking apparatus 110H is particularly referred to as "high-sensitivity subject information (position and speed)".

The control determination unit 410 outputs the input image information to the image output unit 411. Then, upon receiving the image information, the image output unit 411 outputs the received image information to the switching apparatus 130.

Moreover, the control determination unit 410 determines whether the high-sensitivity subject information (position and speed) has been input from the subject information input unit 415. If it is determined that the high-sensitivity subject information (position and speed) has been input, the control determination unit 410 outputs the high-sensitivity subject information (position and speed) to a target angle-of-view calculation unit 412.

On the other hand, if it is determined that the high-sensitivity subject information (position and speed) has not been input, the control determination unit 410 determines whether to perform PTZ control, based on the subject movement amount information and the movement amount threshold value $T_L$ input from the movement amount calculation unit 405 and the subject position information. Then, if the subject movement amount is greater than the movement amount threshold value $T_L$, the control determination unit 410 determines to perform PTZ control, and, on the other hand, if the subject movement amount is less than or equal to the movement amount threshold value $T_L$, the control determination unit 410 determines not to perform PTZ control. When determining to perform PTZ control, the control determination unit 410 outputs, to the target angle-of-view calculation unit 412, the subject movement amount information and the movement amount threshold value $T_L$ input from the movement amount calculation unit 405 and the subject position information.

Furthermore, in a case where no subject has been detected by the subject detection unit 404, the control determination unit 410 determines to perform zoom-out control and thus outputs a zoom-out command to the target angle-of-view calculation unit 412.

The target angle-of-view calculation unit 412 determines whether the high-sensitivity subject information (position and speed) has been input. If it is determined that the high-sensitivity subject information (position and speed) has been input, the target angle-of-view calculation unit 412 calculates a target image capturing direction and angle of view based on the high-sensitivity subject information (position and speed) and the target acquisition position information. On the other hand, if it is determined that the high-sensitivity subject information (position and speed) has not been input, the target angle-of-view calculation unit 412 calculates a target image capturing direction and angle of view based on the subject movement amount information, the movement amount threshold value $T_L$, the subject position information, and the target acquisition position information, which have been input from the movement amount calculation unit 405 via the control determination unit 410. Then, the target angle-of-view calculation unit 412 outputs, to a PTZ speed calculation unit 413, information about the calculated target image capturing direction and angle of view and the subject movement amount information input via the control determination unit 410.

In a case where the high-sensitivity subject information (position and speed) has been input from the control determination unit 410, the PTZ speed calculation unit 413 sets subject speeds included in the high-sensitivity subject information (position and speed) as PT speeds. On the other hand, in a case where the high-sensitivity subject information (position and speed) has not been input from the control determination unit 410, the PTZ speed calculation unit 413 calculates PT speeds based on the subject movement amount information calculated by the movement amount calculation unit 405.

Here, when the subject speeds calculated by the movement amount calculation unit 405 are denoted as Y(p, t), PT speeds $P_L(p, t)$, which are calculated by the PTZ speed calculation unit 413, are expressed by the following formula (5) using speed coefficients $S_L(p, t)$:

$$P_L(p,t)=S_L(p,t)\times Y(p,t) \quad (5).$$

Furthermore, while, even in the low-sensitivity tracking apparatus 110L, the PT speeds are calculated with use of the subject speeds Y(p, t) and the speed coefficients $S_L(p, t)$, for example, previously determined fixed values can be used as the PT speeds, or PT speeds corresponding to the subject speeds can be read out from a preliminarily prepared speed table and be used as the above-mentioned PT speeds. Moreover, with regard to a zooming driving speed, the PTZ speed calculation unit 413 uses a zooming driving speed for a case where no subject has been detected by the subject detection unit 404 and a zooming command has been output from the control determination unit 410.

Then, the PTZ speed calculation unit 413 outputs the calculated PT speed information, target image capturing direction, and angle-of-view information to the PTZ driving control unit 414.

Accordingly, the PTZ driving control unit 414 generates a PT control command and a zooming control command based on the input image capturing direction, angle-of-view information, and PT speed information. Then, the PT control command is output to the PT driving device 402, and the zooming control command is output to the image capturing apparatus 401.

The PT driving device 402 performs PT driving of the electrically driven tripod head based on the input PT control command. The image capturing apparatus 401 performs zooming driving based on the input zooming control command.

Next, a functional configuration of the switching apparatus 130 illustrated in FIG. 5 is described.

Furthermore, in FIG. 5, as other apparatuses, for example, connected to the switching apparatus 130, the high-sensitivity tracking apparatus 110H, the low-sensitivity tracking apparatus 110L, and the output apparatus 140 are also illustrated. The network 150 is omitted from illustration.

Image switching information transmitted from the switching information output unit 309 of the high-sensitivity tracking apparatus 110H is input to a switching information input unit 516 of the switching apparatus 130. Moreover, image information transmitted from the image output unit 311 of the high-sensitivity tracking apparatus 110H and image information transmitted from the image output unit 411 of the low-sensitivity tracking apparatus 110L are input to an image input unit 517 of the switching apparatus 130 and are then input to an image switching unit 518.

In a case where image switching information has been transmitted from the high-sensitivity tracking apparatus 110H, the switching information input unit 516 outputs the image switching information to the image switching unit 518.

Upon receiving the image switching information, the image switching unit 518 selects any one of image information transmitted from the high-sensitivity tracking apparatus 110H and image information transmitted from the low-sensitivity tracking apparatus 110L based on the image switching information and then outputs the selected image information to an image output unit 519. Thus, in a case where the image switching information is information for issuing an instruction for switching to an image obtained by low-sensitivity tracking, the image switching unit 518 selects image information input from the low-sensitivity tracking apparatus 110L and then outputs the selected image information to the image output unit 519. On the other hand, in a case where the image switching information is information for issuing an instruction for switching to an image obtained by high-sensitivity tracking, the image switching unit 518 selects image information input from the high-sensitivity tracking apparatus 110H and then outputs the selected image information to the image output unit 519.

The image output unit 519 outputs the image information input from the image switching unit 518 to the output apparatus 140.

Figure 7:
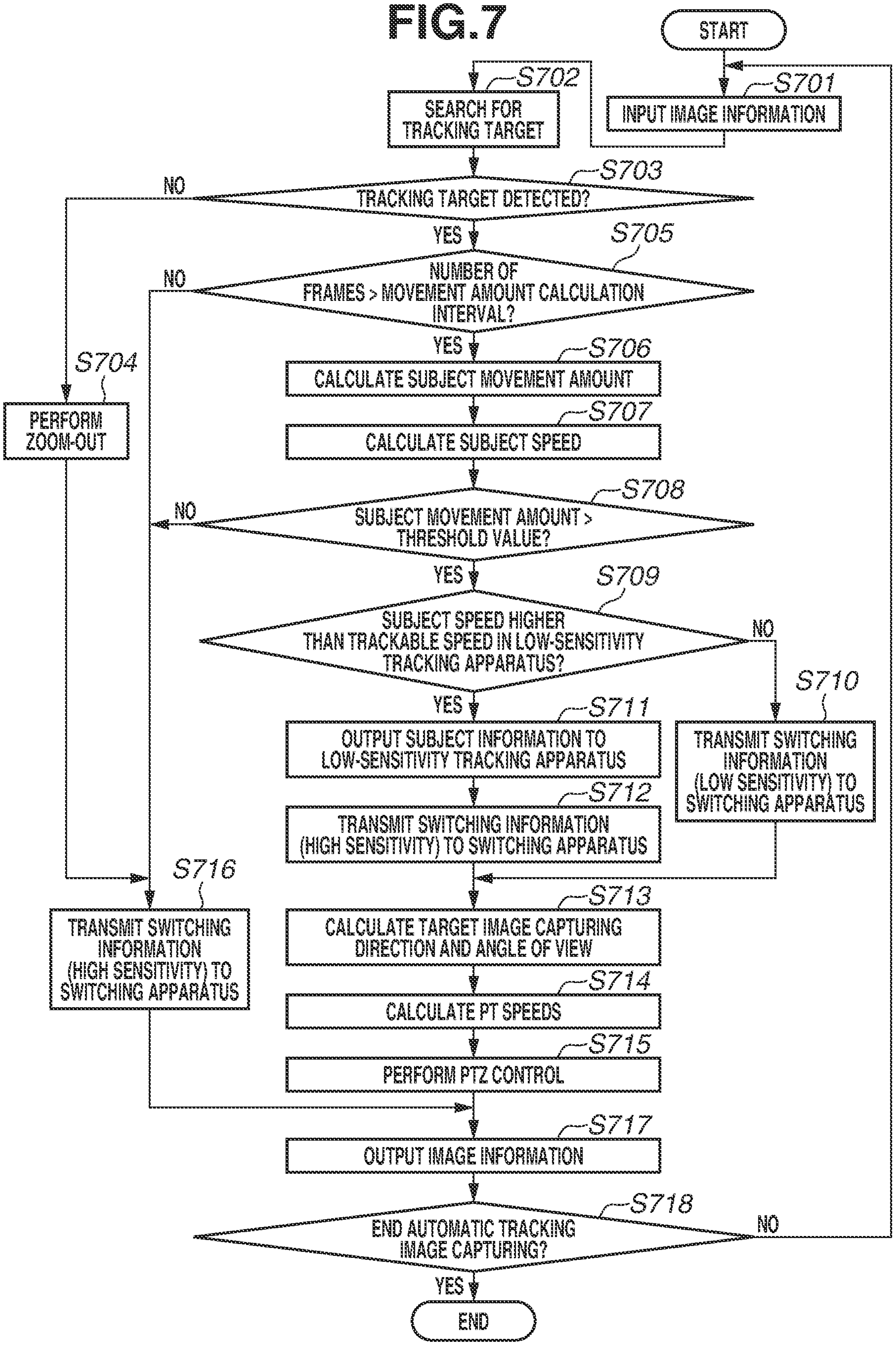
FIG. 7 is a flowchart of processing which is performed by the high-sensitivity tracking apparatus in the first exemplary embodiment.
Figure 8:
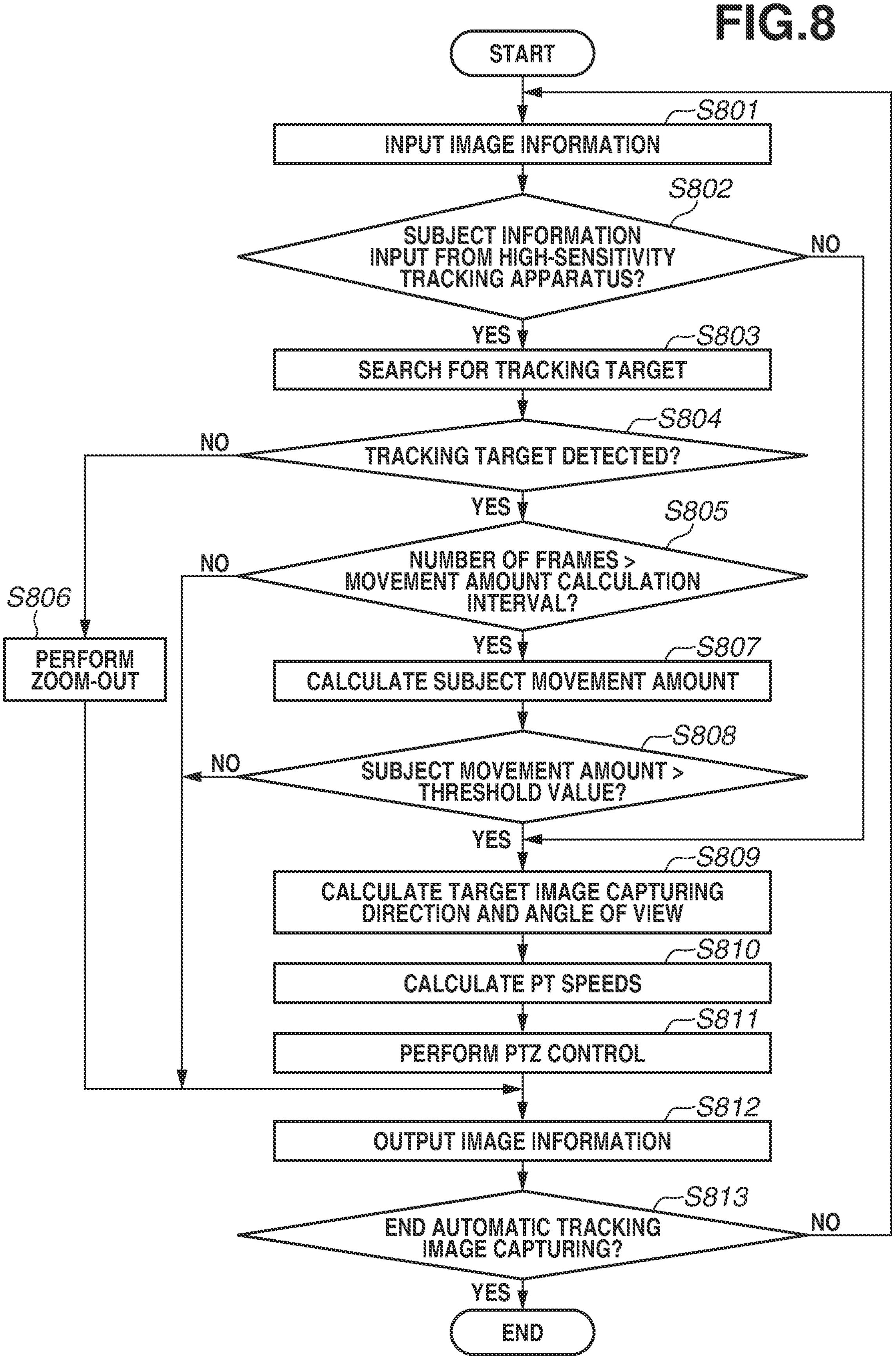
FIG. 8 is a flowchart of processing which is performed by the low-sensitivity tracking apparatus in the first exemplary embodiment.
Figure 9:
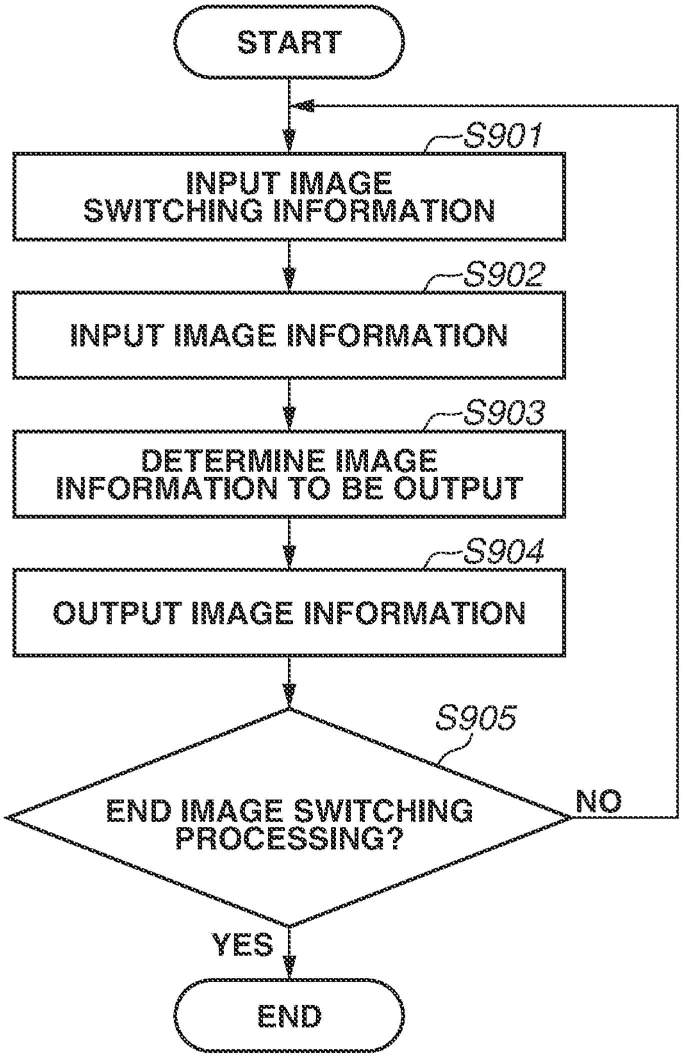
FIG. 9 is a flowchart of processing which is performed by the switching apparatus in the first exemplary embodiment.

FIG. 7 to FIG. 9 are flowcharts illustrating the flows of processing which are performed by the respective apparatuses in the automatic image capturing system 100 according to the first exemplary embodiment illustrated in FIG. 3 to FIG. 6. FIG. 7 is a flowchart of processing which is performed by the high-sensitivity tracking apparatus 110H configured as illustrated in FIG. 3, FIG. 8 is a flowchart of processing which is performed by the low-sensitivity tracking apparatus 110L configured as illustrated in FIG. 4, and FIG. 9 is a flowchart of processing which is performed by the switching apparatus 130 configured as illustrated in FIG. 5.

First, the flow of processing which is performed by the high-sensitivity tracking apparatus 110H is described with reference to the flowchart of FIG. 7.

When started up by a user operation performed via, for example, an operation unit (not illustrated), in step S701, the high-sensitivity tracking apparatus 110H causes the image capturing apparatus 301 to start image capturing for a moving image, so that image information input to the image input unit 303 is output to the subject detection unit 304.

In step S702, the subject detection unit 304 searches for a subject serving as a tracking target (image capturing object) from the image information input from the image input unit 303, and, then in step S703, the subject detection unit 304 determines whether a subject has been detected. If it is determined by the subject detection unit 304 that a subject has been detected (YES in step S703), the high-sensitivity tracking apparatus 110H advances the processing to step S705. On the other hand, if it is determined that no subject has been detected (NO in step S703), the high-sensitivity tracking apparatus 110H advances the processing to step S704.

In step S704, since any subject has not been detected by the subject detection unit 304, the control determination unit 310 outputs a zoom-out command to the target angle-of-view calculation unit 312. The zoom-out command is transmitted from the target angle-of-view calculation unit 312 to the PTZ driving control unit 314 via the PTZ speed calculation unit 313 and is then transmitted from the PTZ driving control unit 314 to the image capturing apparatus 301. With this processing operation, the image capturing apparatus 301 performs zoom-out, thus performing image capturing at a wide angle of view. After step S704, the high-sensitivity tracking apparatus 110H advances the processing to step S716.

In step S716, the switching information output unit 309 outputs, to the switching apparatus 130, image switching information for issuing an instruction for selecting an image obtained by the high-sensitivity tracking apparatus 110H. Then, after step S716, the high-sensitivity tracking apparatus 110H advances the processing to step S717.

In step S717, the image output unit 311 outputs image information.

Then, in step S718, the high-sensitivity tracking apparatus 110H determines whether an instruction for ending automatic tracking image capturing has been input by a user operation performed via an operation unit (not illustrated). If it is determined that a user instruction for ending automatic tracking image capturing has been input (YES in step S718), the high-sensitivity tracking apparatus 110H ends the processing in the flowchart of FIG. 7, and, on the other hand, if it is determined that the user instruction has not been input (NO in step S718), the high-sensitivity tracking apparatus 110H returns the processing to step S701.

In step S705, the movement amount calculation unit 305 determines whether the number of frames of the input image information is greater than the movement amount calculation interval $M_H$. Then, if it is determined that the number of frames is greater than the movement amount calculation interval $M_H$ (YES in step S705), the movement amount calculation unit 305 performs a processing operation in step S706. On the other hand, if it is determined by the movement amount calculation unit 305 that the number of frames is less than or equal to the movement amount calculation interval $M_H$ (NO in step S705), the high-sensitivity tracking apparatus 110H advances the processing to step S716. Processing operations in step S716 and subsequent steps are similar to those described above.

In step S706, the movement amount calculation unit 305 calculates the movement amount of a subject relative to the target acquisition position based on the subject position information and the target acquisition position information as described above, and then outputs the calculated subject movement amount information to the speed calculation unit 306. After step S706, the high-sensitivity tracking apparatus 110H advances the processing to step S707.

In step S707, the speed calculation unit 306 calculates a subject speed based on subject movement amount information input at the present time and last-time subject position information as described above. Then, the subject speed information is transmitted to the control determination unit 310. After step S707, the high-sensitivity tracking apparatus 110H advances the processing to step S708.

In step S708, the control determination unit 310 determines whether the input subject movement amount information is greater than the movement amount threshold value $T_H$. Then, if it is determined by the control determination unit 310 that the subject movement amount information is greater than the movement amount threshold value $T_H$ (YES in step S708), the high-sensitivity tracking apparatus 110H advances the processing to step S709, and, on the other hand, if it is determined that the subject movement amount information is less than or equal to the movement amount threshold value $T_H$ (NO in step S708), the high-sensitivity tracking apparatus 110H advances the processing to step S716.

In step S709, the switching determination unit 307 determines whether the subject speed is higher than the trackable speed $S_R$ in the low-sensitivity tracking apparatus 110L. If it is determined that the subject speed is lower than or equal to the trackable speed $S_R$ (NO in step S709), then in step S710, the switching determination unit 307 outputs, to the switching information output unit 309, image switching information indicating that an image obtained by the low-sensitivity tracking apparatus 110L is to be selected. With this processing operation, the image switching information indicating that an image obtained by the low-sensitivity tracking apparatus 110L is to be selected is output from the switching information output unit 309 to the switching apparatus 130. Then, after step S710, the high-sensitivity tracking apparatus 110H advances the processing to step S713. On the other hand, if it is determined that the subject speed is higher than the trackable speed $S_R$ (YES in step S709), the switching determination unit 307 performs a processing operation in step S711.

In step S711, the switching determination unit 307 transmits subject information (position and speed) to the subject information output unit 308, so that the subject information (position and speed) is output to the low-sensitivity tracking apparatus 110L.

Next, in step S712, the switching determination unit 307 outputs, to the switching information output unit 309, image switching information indicating that an image obtained by the high-sensitivity tracking apparatus 110H is to be selected. With this processing operation, the image switching information indicating that an image obtained by the high-sensitivity tracking apparatus 110H is to be selected is output from the switching information output unit 309 to the switching apparatus 130. Then, after step S712, the high-sensitivity tracking apparatus 110H advances the processing to step S713.

In step S713, the target angle-of-view calculation unit 312 calculates a target image capturing direction and angle of view based on the information about the target acquisition position and the subject information (position and speed) in the way described above. After step S714, the high-sensitivity tracking apparatus 110H advances the processing to step S714.

In step S714, the PTZ speed calculation unit 313 calculates PT speed information based on the input subject movement amount information and the subject information (position and speed).

Next, in step S715, the PTZ driving control unit 314 generates a PT control command based on the input image capturing direction and angle-of-view information and the PT speed information, and outputs the PT control command to the PT driving device 302. After step S715, the high-sensitivity tracking apparatus 110H advances the processing to step S717.

Processing operations in step S717 and subsequent steps are similar to those described above.

Next, the flow of processing which is performed by the low-sensitivity tracking apparatus 110L is described with reference to the flowchart of FIG. 8.

When started up by a user operation performed via an operation unit (not illustrated), in step S801, the low-sensitivity tracking apparatus 110L causes the image capturing apparatus 401 to start image capturing for a moving image, so that image information input to the image input unit 403 is output to the subject detection unit 404.

Moreover, in step S802, the subject information input unit 415 determines whether high-sensitivity subject information (position and speed) has been input from the high-sensitivity tracking apparatus 110H. If it is determined by the subject information input unit 415 that high-sensitivity subject information (position and speed) has been input (YES in step S802), the low-sensitivity tracking apparatus 110L advances the processing to step S803. On the other hand, if it is determined that high-sensitivity subject information (position and speed) has not been input (NO in step S802), the low-sensitivity tracking apparatus 110L advances the processing to step S809.

In step S803, the subject detection unit 404 searches for a subject serving as a tracking target from the input image information, and, then in step S804, the subject detection unit 404 determines whether a subject has been detected. If it is determined by the subject detection unit 404 that a subject has been detected (YES in step S804), the low-sensitivity tracking apparatus 110L advances the processing to step S805. On the other hand, if it is determined that no subject has been detected (NO in step S804), the low-sensitivity tracking apparatus 110L advances the processing to step S806.

In step S806, since any subject has not been detected by the subject detection unit 404, the control determination unit 410 outputs a zoom-out command to the target angle-of-view calculation unit 412. The zoom-out command is transmitted from the target angle-of-view calculation unit 412 to the PTZ driving control unit 414 via the PTZ speed calculation unit 413 and is then transmitted from the PTZ driving control unit 414 to the image capturing apparatus 401. With this processing operation, the image capturing apparatus 401 performs zoom-out, thus performing image capturing at a wide angle of view. After step S806, the low-sensitivity tracking apparatus 110L advances the processing to step S812.

In step S812, the image output unit 411 outputs image information. Then, next, in step S813, the low-sensitivity tracking apparatus 110L determines whether an instruction for ending automatic tracking image capturing has been input by a user operation performed via an operation unit (not illustrated). If it is determined that a user instruction for ending automatic tracking image capturing has been input (YES in step S813), the low-sensitivity tracking apparatus 110L ends the processing in the flowchart of FIG. 8, and, on the other hand, if it is determined that the user instruction has not been input (NO in step S813), the low-sensitivity tracking apparatus 110L returns the processing to step S801.

In step S805, the movement amount calculation unit 405 determines whether the number of frames of the input image information is greater than the movement amount calculation interval $M_L$. If it is determined that the number of frames is greater than the movement amount calculation interval $M_L$ (YES in step S805), then in step S807, the movement amount calculation unit 405 calculates a subject movement amount. Then, after step S807, the low-sensitivity tracking apparatus 110L advances the processing to step S808. On the other hand, if, in step S805, it is determined by the movement amount calculation unit 405 that the number of frames of the input image information is less than or equal to the movement amount calculation interval $M_L$ (NO in step S805), the low-sensitivity tracking apparatus 110L advances the processing to step S812.

In step S808, the control determination unit 410 determines whether to perform PTZ control based on the subject movement amount information and the movement amount threshold value $T_L$. If it is determined that the subject movement amount information is greater than the movement amount threshold value $T_L$ (YES in step S808), the control determination unit 410 determines to perform PTZ control and then outputs the high-sensitivity subject information (position and speed) and the subject movement amount information to the target angle-of-view calculation unit 412. Then, the low-sensitivity tracking apparatus 110L advances the processing to step S809. On the other hand, if it is determined that the subject movement amount information is less than or equal to the movement amount threshold value $T_L$ (NO in step S808), the control determination unit 410 determines not to perform PTZ control. Then, the low-sensitivity tracking apparatus 110L advances the processing to step S812.

In step S809, in a case where the high-sensitivity subject information (position and speed) has been input, the target angle-of-view calculation unit 412 calculates a target image capturing direction and angle of view based on the high-sensitivity subject information (position and speed) and the target acquisition position information. On the other hand, in a case where the high-sensitivity subject information (position and speed) has not been input, the target angle-of-view calculation unit 412 calculates a target image capturing direction and angle of view based on the subject movement amount information, the movement amount threshold value $T_L$, the subject position information, and the target acquisition position information transmitted from the movement amount calculation unit 405 via the control determination unit 410. After step S809, the low-sensitivity tracking apparatus 110L advances the processing to step S810.

In step S810, in a case where the high-sensitivity subject information (position and speed) has been input, the PTZ speed calculation unit 413 sets subject speeds included in the high-sensitivity subject information (position and speed) as PT speeds. On the other hand, in a case where the high-sensitivity subject information (position and speed) has not been input, the PTZ speed calculation unit 413 calculates PT speeds based on the subject movement amount information calculated by the movement amount calculation unit 405.

Next, in step S811, the PTZ driving control unit 414 generates a PT control command or zooming control command based on the input image capturing direction and angle-of-view information and the PT speed information, and outputs the PT control command or zooming control command to the PT driving device 402. After step S811, the low-sensitivity tracking apparatus 110L advances the processing to step S812. Processing operations in step S812 and subsequent steps are similar to those described above.

Next, the flow of processing which is performed by the switching apparatus 130 is described with reference to the flowchart of FIG. 9.

When started up by a user operation performed via an operation unit (not illustrated), the switching apparatus 130 starts image switching output processing illustrated in the flowchart of FIG. 9. First, in step S901, in a case where image switching information has been input from the high-sensitivity tracking apparatus 110H, the switching information input unit 516 outputs the image switching information to the image switching unit 518. Then, the switching apparatus 130 advances the processing to step S902.

In step S902, the image input unit 517 outputs, to the image switching unit 518, image information input from the high-sensitivity tracking apparatus 110H and image information input from the low-sensitivity tracking apparatus 110L. Then, the switching apparatus 130 advances the processing to step S903.

In step S903, in a case where image switching information has been input from the switching information input unit 516, the image switching unit 518 determines which of image information transmitted from the high-sensitivity tracking apparatus 110H and image information transmitted from the low-sensitivity tracking apparatus 110L to select, based on the image switching information. Then, next, in step S904, the image switching unit 518 outputs the image information selected in step S903 to the image output unit 519. With this processing operation, the image information is output from the image output unit 519.

Next, in step S905, the switching apparatus 130 determines whether an instruction for ending the image switching processing has been input by a user operation performed via an operation unit (not illustrated). Then, if it is determined that an instruction for ending the image switching processing has been input (YES in step S905), the switching apparatus 130 ends the processing in the flowchart of FIG. 9, and, if it is determined that the instruction for ending the image switching processing has not been input (NO in step S905), the switching apparatus 130 returns the processing to step S901.

As described above, the automatic image capturing system 100 in the first exemplary embodiment causes two tracking apparatuses, i.e., the low-sensitivity tracking apparatus 110L, which smoothly tracks a subject, and the high-sensitivity tracking apparatus 110H, which performs PTZ control even for sudden motion of a subject, to operate in cooperation with each other, thus performing automatic tracking image capturing of the same subject. Then, the automatic image capturing system 100 performs image switching in such a way as to select any one of image information obtained by the low-sensitivity tracking apparatus 110L performing tracking and image information obtained by the high-sensitivity tracking apparatus 110H performing tracking according to image switching information that is based on a subject speed and set the selected image information as output image information. This enables the automatic image capturing system 100 in the first exemplary embodiment to output an automatically tracked image which is obtained without missing sudden motion or rapid motion of a subject and which is smooth.

Next, an information processing apparatus according to a second exemplary embodiment is described.

Figure 10:
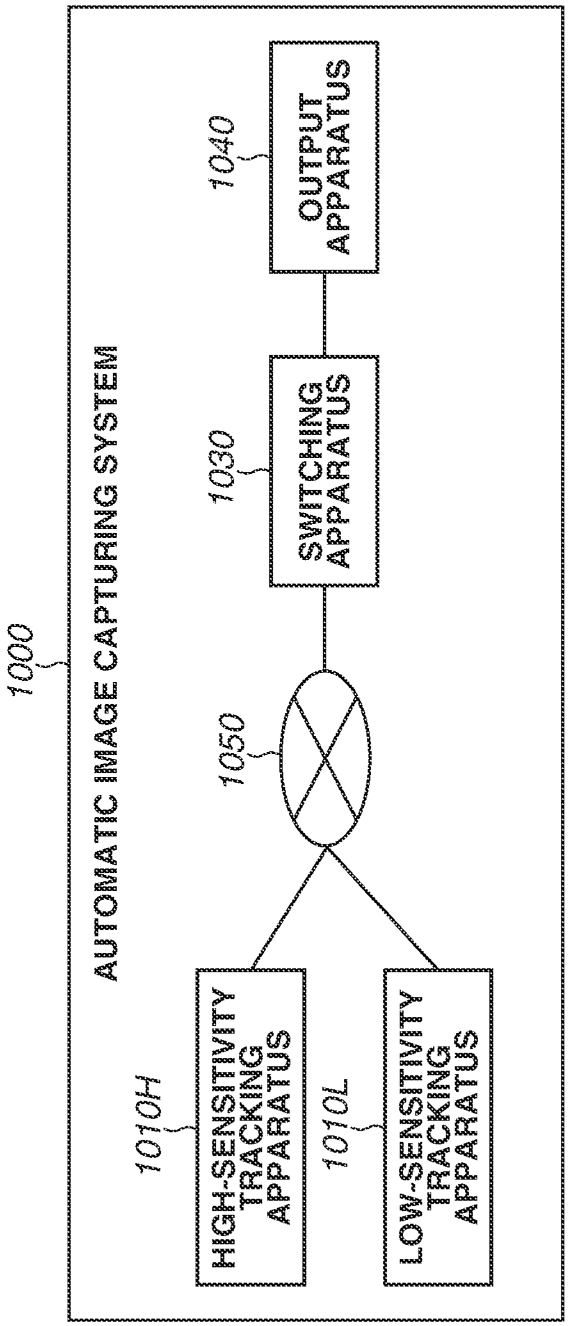
FIG. 10 is a diagram illustrating a configuration example of an automatic image capturing system according to a second exemplary embodiment.

FIG. 10 is a diagram illustrating an outline configuration of an automatic image capturing system 1000, which is an application example of the information processing apparatus according to the second exemplary embodiment.

As illustrated in FIG. 10, the automatic image capturing system 1000 is configured to include a plurality of tracking apparatuses differing in tracking sensitivity (in the example illustrated in FIG. 10, a high-sensitivity tracking apparatus 1010H and a low-sensitivity tracking apparatus 1010L), a switching apparatus 1030, and an output apparatus 1040. The high-sensitivity tracking apparatus 1010H, the low-sensitivity tracking apparatus 1010L, and the switching apparatus 1030 are connected to each other via a network 1050.

As with the example illustrated in the first exemplary embodiment, in the automatic image capturing system 1000 in the second exemplary embodiment, a plurality of automatic tracking apparatuses differing in tracking sensitivity (the high-sensitivity tracking apparatus 1010H and the low-sensitivity tracking apparatus 1010L) cooperate with each other to perform automatic tracking image capturing of a subject such as a sport athlete. Moreover, as with the example illustrated in the first exemplary embodiment, each of the high-sensitivity tracking apparatus 1010H and the low-sensitivity tracking apparatus 1010L is equipped with an image capturing apparatus (such as an IP camera), which has a zooming function, and an electrically driven tripod head, which is capable of moving the image capturing apparatus in PT directions.

The high-sensitivity tracking apparatus 1010H is an automatic tracking apparatus the tracking sensitivity of which is set to high sensitivity, and the low-sensitivity tracking apparatus 1010L is an automatic tracking apparatus the tracking sensitivity of which is set to low sensitivity as compared with the high-sensitivity tracking apparatus 1010H.

The high-sensitivity tracking apparatus 1010H performs image capturing for a moving image while tracking a subject at high-sensitivity tracking sensitivity. The high-sensitivity tracking apparatus 1010H in the second exemplary embodiment appends subject information (position and speed) representing the position and motion of a subject as metadata to image information. Then, the high-sensitivity tracking apparatus 1010H transmits image information with the subject information (position and speed) appended thereto as metadata to the switching apparatus 1030 via the network 1050. Details of, for example, a configuration of the high-sensitivity tracking apparatus 1010H in the second exemplary embodiment are described below.

The low-sensitivity tracking apparatus 1010L performs image capturing for a moving image while tracking a subject at low-sensitivity tracking sensitivity, and transmits image information obtained by image capturing to the switching apparatus 1030 via the network 1050. Moreover, the low-sensitivity tracking apparatus 1010L in the second exemplary embodiment sets subject position information as subject information and then appends the subject information as metadata to the image information. In the following description, subject information in the low-sensitivity tracking apparatus 1010L in the second exemplary embodiment is referred to as "subject information (position)". Then, the low-sensitivity tracking apparatus 1010L transmits image information with the subject information (position) appended thereto as metadata to the switching apparatus 1030 via the network 1050. Details of, for example, a configuration of the low-sensitivity tracking apparatus 1010L in the second exemplary embodiment are described below.

The switching apparatus 1030 selects any one of pieces of image information respectively transmitted from the high-sensitivity tracking apparatus 1010H and the low-sensitivity tracking apparatus 1010L via the network 1050, and outputs the selected image information to the output apparatus 1040. In the case of the second exemplary embodiment, the switching apparatus 1030 acquires, from the high-sensitivity tracking apparatus 1010H, image information and subject information (position and speed) appended thereto as metadata. Similarly, the switching apparatus 1030 acquires, from the low-sensitivity tracking apparatus 1010L, image information and subject information (position) appended thereto as metadata. Additionally, the switching apparatus 1030 determines which of pieces of image information respectively transmitted from the high-sensitivity tracking apparatus 1010H and the low-sensitivity tracking apparatus 1010L to select and output, based on the subject information (position and speed) and the subject information (position). Then, the switching apparatus 1030 outputs the image information selected according to the determination to the output apparatus 1040. Details of a configuration of the switching apparatus 1030 and image switching processing which is performed by the switching apparatus 1030 are described below.

The output apparatus 1040, for example, displays the image information transmitted from the switching apparatus 1030.

Furthermore, the output apparatus 1040 is also able to record the image information transmitted from the switching apparatus 1030.

Even in the second exemplary embodiment, as with that described in the first exemplary embodiment, parameters of tracking sensitivity setting for the high-sensitivity tracking apparatus 1010H are assumed to be the movement amount calculation interval $M_H$ (the number of frames), the movement amount threshold value $T_H$, and the PT speed coefficients $S_H(p, t)$. Thus, the high-sensitivity tracking apparatus 1010H calculates the subject movement amount at intervals of the number of frames $M_H$, which is the movement amount calculation interval $M_H$, and, in a case where the subject movement amount has exceeded the movement amount threshold value $T_H$, the high-sensitivity tracking apparatus 1010H performs PT control with the PT speed coefficients $S_H$(p, t), thus tracking a subject. Similarly, parameters of tracking sensitivity setting for the low-sensitivity tracking apparatus 1010L in the second exemplary embodiment are assumed to be the movement amount calculation interval $M_L$ (the number of frames), the movement amount threshold value $T_L$, and the PT speed coefficients $S_L$(p, t). Moreover, the maximum speed of subject speeds at which the low-sensitivity tracking apparatus 1010L is able to perform tracking is referred to as "trackable speed $S_R$". Thus, the low-sensitivity tracking apparatus 1010L calculates the subject movement amount at intervals of the number of frames $M_L$, which is the movement amount calculation interval $M_L$, and, in a case where the subject movement amount has exceeded the movement amount threshold value $T_L$, the low-sensitivity tracking apparatus 1010L performs PT control with the PT speed coefficients $S_L$(p, t), thus tracking a subject. Moreover, even in the second exemplary embodiment, the movement amount calculation interval $M_H$, the movement amount threshold value $T_H$, and the PT speed coefficients $S_H$(p, t) and the movement amount calculation interval $M_L$, the movement amount threshold value $T_L$, and the PT speed coefficients $S_L$(p, t) have relationships expressed by the above-mentioned formulae (1) to (3).

Moreover, even in the case of the second exemplary embodiment, the high-sensitivity tracking apparatus 1010H checks the motion of a subject at a movement amount calculation interval shorter than that for the low-sensitivity tracking apparatus 1010L, and also performs PT control with PT speed coefficients greater than those for the low-sensitivity tracking apparatus 1010L. Accordingly, the high-sensitivity tracking apparatus 1010H is able to perform image capturing while tracking a quick motion of the subject without missing it, and, on the other hand, the low-sensitivity tracking apparatus 1010L is able to perform image capturing while smoothly tracking a motion of the subject which is slow. Then, the high-sensitivity tracking apparatus 1010H and the low-sensitivity tracking apparatus 1010L in the second exemplary embodiment track the same subject and output any one of an image obtained by the high-sensitivity tracking apparatus 1010H performing tracking and an image obtained by the low-sensitivity tracking apparatus 1010L performing tracking while switching between the images as appropriate.

Moreover, while, even in the example illustrated in FIG. 10, an example in which a set including the high-sensitivity tracking apparatus 1010H and the low-sensitivity tracking apparatus 1010L tracks the same subject is illustrated, a plurality of sets each including a high-sensitivity tracking apparatus and a low-sensitivity tracking apparatus can be prepared. Then, the plurality of sets each including a high-sensitivity tracking apparatus and a low-sensitivity tracking apparatus can be configured to track respective different tracking targets (the tracking target for each set being the same subject).

Hardware configurations respectively applicable to the high-sensitivity tracking apparatus 1010H, the low-sensitivity tracking apparatus 1010L, and the switching apparatus 1030 in the second exemplary embodiment are similar to the configuration illustrated in FIG. 2 described above and are, therefore, omitted from description and illustration.

Figure 11:
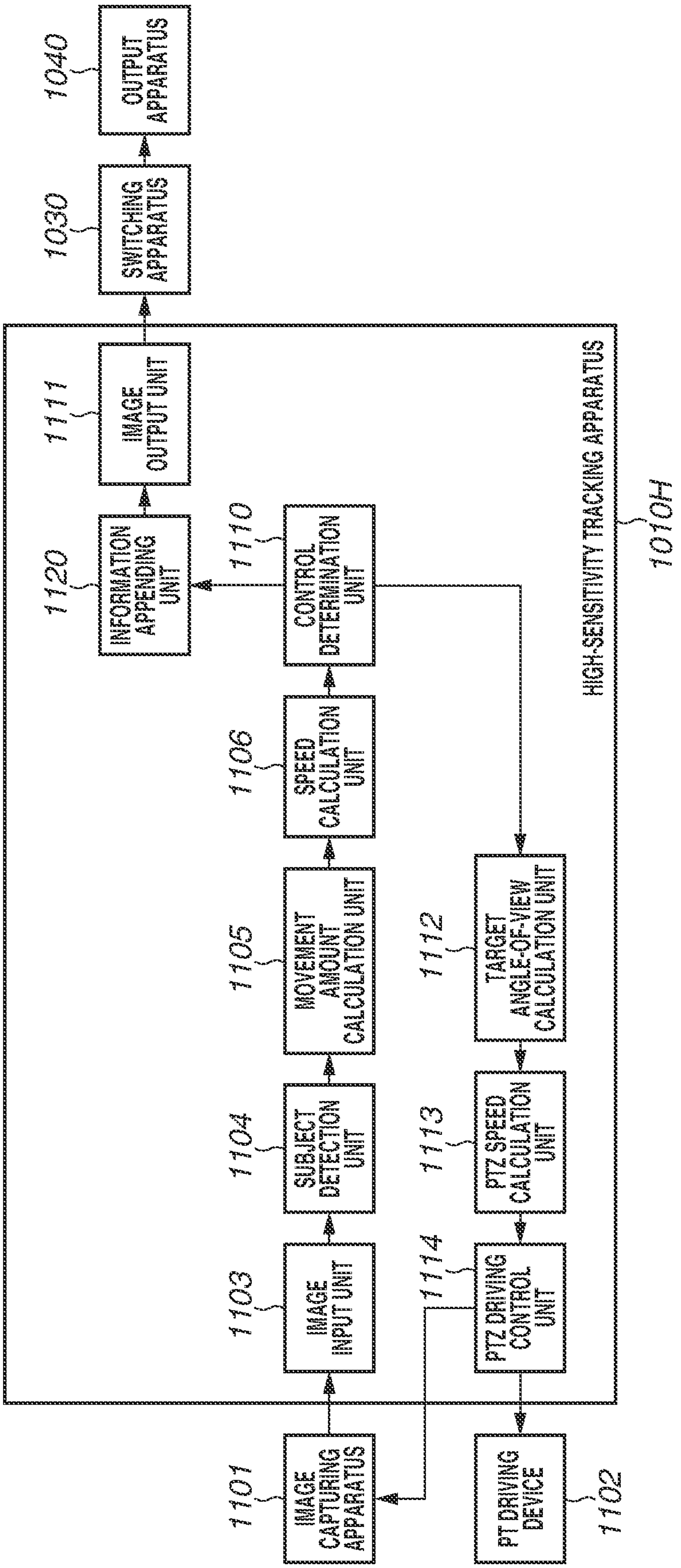
FIG. 11 is a diagram illustrating a configuration example of a high-sensitivity tracking apparatus in the second exemplary embodiment.
Figure 12:
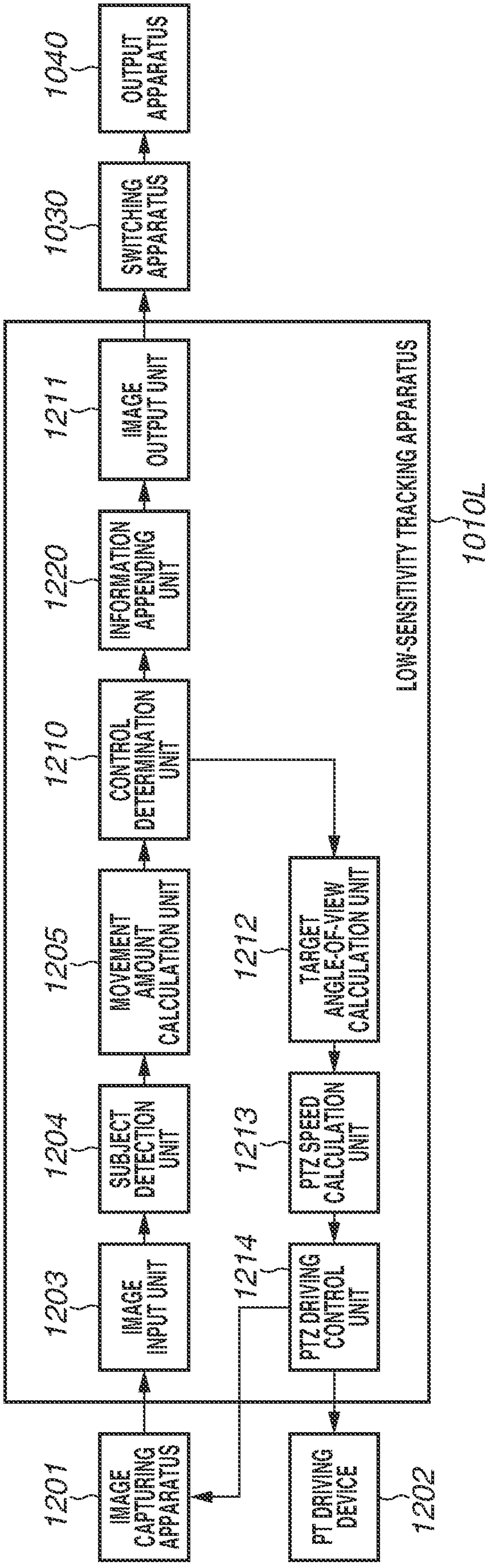
FIG. 12 is a diagram illustrating a configuration example of a low-sensitivity tracking apparatus in the second exemplary embodiment.
Figure 13:
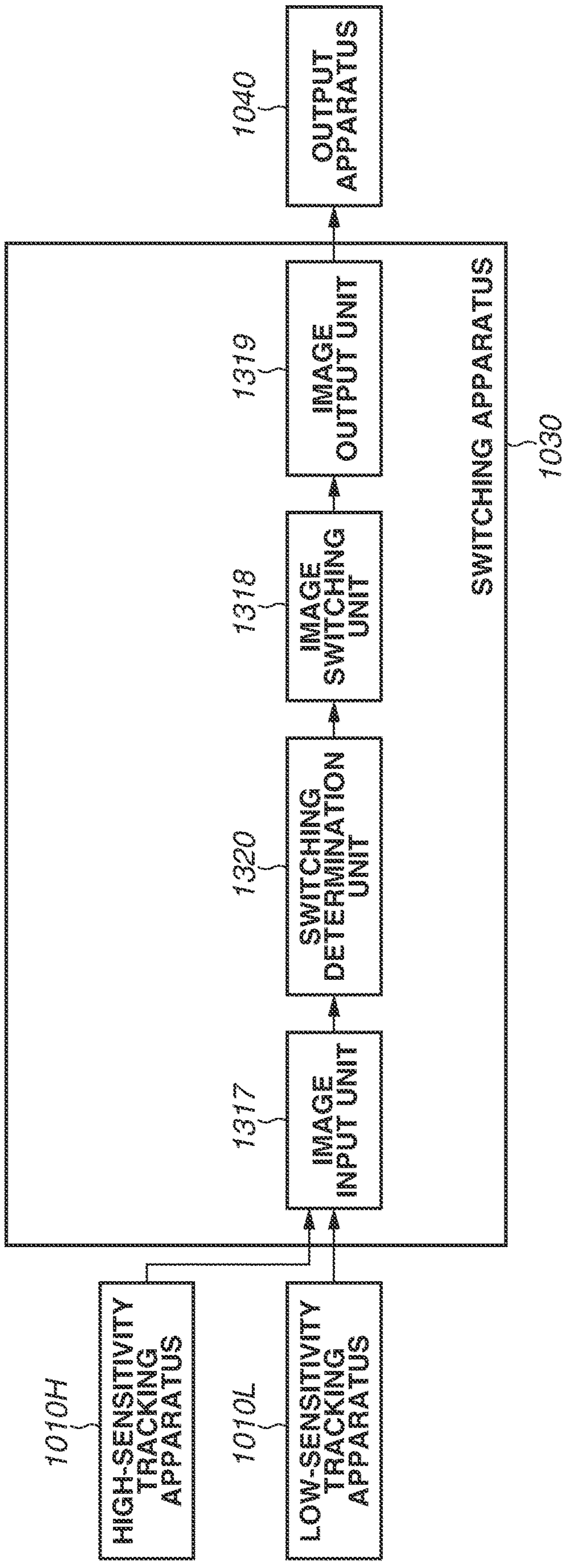
FIG. 13 is a diagram illustrating a configuration example of a switching apparatus in the second exemplary embodiment.

FIG. 11 to FIG. 13 are functional block diagrams illustrating, for example, various functional units which are configured by, for example, the CPU 211 illustrated in FIG. 2 executing an information processing program (automatic tracking image capturing control program) in the second exemplary embodiment.

FIG. 11 is a diagram illustrating a functional configuration of the high-sensitivity tracking apparatus 1010H according to the second exemplary embodiment, FIG. 12 is a diagram illustrating a functional configuration of the low-sensitivity tracking apparatus 1010L according to the second exemplary embodiment, and FIG. 13 is a diagram illustrating a functional configuration of the switching apparatus 1030 according to the second exemplary embodiment. Furthermore, while the respective functional units illustrated in FIG. 11 to FIG. 13 are assumed to be functional units which are configured by the CPU 211 executing the automatic tracking image capturing control program in the second exemplary embodiment, a part or the whole of the respective functional units illustrated in FIG. 11 to FIG. 13 can be implemented as a dedicated hardware circuit. Moreover, even in the examples illustrated in FIG. 11 to FIG. 13 in the second exemplary embodiment, the high-sensitivity tracking apparatus 1010H, the low-sensitivity tracking apparatus 1010L, and the switching apparatus 1030, instead of having respective different configurations, can be integrated into one apparatus configuration.

First, a functional configuration of the high-sensitivity tracking apparatus 1010H illustrated in FIG. 11 is described. Furthermore, in FIG. 11, as other apparatuses, for example, connected to the high-sensitivity tracking apparatus 1010H, an image capturing apparatus 1101, a PT driving device 1102, the switching apparatus 1030, and the output apparatus 1040 are also illustrated. The network 1050 is omitted from illustration. Moreover, the image capturing apparatus 1101 and the PT driving device 1102 are similar to the image capturing apparatus 301 and the PT driving device 302 illustrated in FIG. 3, respectively, and are, therefore, omitted from description. Additionally, an image input unit 1103 to a movement amount calculation unit 1105 and an image output unit 1111 to a PTZ driving control unit 1114 are similar to the image input unit 303 to the movement amount calculation unit 305 and the image output unit 311 to the PTZ driving control unit 314 illustrated in FIG. 3, respectively, and are, therefore, omitted from description.

The movement amount calculation unit 1105 of the high-sensitivity tracking apparatus 1010H outputs, to a speed calculation unit 1106, subject movement amount information calculated thereby and subject position information and image information input from the subject detection unit 1104.

The speed calculation unit 1106 calculates a subject speed in a way similar to the above-mentioned way for the speed calculation unit 306. In the case of the second exemplary embodiment, the speed calculation unit 1106 sets the calculated subject speed information and the subject position information input from the movement amount calculation unit 1105 as subject information (position and speed). Then, the speed calculation unit 1106 outputs, to a control determination unit 1110, the subject information (position and speed) and the subject movement amount information and image information input from the movement amount calculation unit 1105.

As with the above-mentioned control determination unit 310, the control determination unit 1110 determines whether to perform PTZ control based on the input subject movement amount information and the movement amount threshold value $T_H$. Then, when determining to perform PTZ control, the control determination unit 1110 outputs the subject information (position and speed) and the subject movement amount information to a target angle-of-view calculation unit 1112. Moreover, as with the above-mentioned way, in a case where no subject has been detected by the subject detection unit 1104, the control determination unit 1110 determines to perform zoom-out control, thus outputting a zoom-out command to the target angle-of-view calculation unit 1112. In the case of the second exemplary embodiment, the control determination unit 1110 outputs the input image information and subject information (position and speed) to an information appending unit 1120.

The information appending unit 1120 appends the subject information (position and speed) as metadata to the input image information. Then, the information appending unit 1120 outputs the image information with the subject information (position and speed) appended thereto as metadata to the image output unit 1111. Thus, in the case of the second exemplary embodiment, the image information with the subject information (position and speed) appended thereto as metadata is output from the high-sensitivity tracking apparatus 1010H, and is then transmitted to the switching apparatus 1030 via the network 1050.

Next, a functional configuration of the low-sensitivity tracking apparatus 1010L illustrated in FIG. 12 is described. Furthermore, in FIG. 12, as other apparatuses, for example, connected to the low-sensitivity tracking apparatus 1010L, an image capturing apparatus 1201, a PT driving device 1202, the switching apparatus 1030, and the output apparatus 1040 are also illustrated. The network 1050 is omitted from illustration. Moreover, the image capturing apparatus 1201 and the PT driving device 1202 are similar to the image capturing apparatus 401 and the PT driving device 402 illustrated in FIG. 4, respectively, and are, therefore, omitted from description. Additionally, an image input unit 1203 to a movement amount calculation unit 1205, an image output unit 1211, and a PTZ driving control unit 1214 are similar to the image input unit 403 to the movement amount calculation unit 405, the image output unit 411, and the PTZ driving control unit 414 illustrated in FIG. 4, respectively, and are, therefore, omitted from description.

The movement amount calculation unit 1205 of the low-sensitivity tracking apparatus 1010L outputs, to a control determination unit 1210, subject movement amount information calculated thereby and subject position information and image information input from the subject detection unit 1204. Moreover, in the case of the second exemplary embodiment, the movement amount calculation unit 1205 sets the subject position information as subject information (position).

As with the above-mentioned control determination unit 410, the control determination unit 1210 determines whether to perform PTZ control based on the input subject movement amount information, the movement amount threshold value $T_L$, and the subject position information. Then, when determining to perform PTZ control, the control determination unit 1210 outputs the subject movement amount information and the subject position information to a target angle-of-view calculation unit 1212. Moreover, in the case of the second exemplary embodiment, the control determination unit 1210 outputs, to an information appending unit 1220, the subject information (position) and image information input from the movement amount calculation unit 1205.

The information appending unit 1220 appends the subject information (position) as metadata to the input image information. Then, the information appending unit 1220 outputs the image information with the subject information (position) appended thereto to the image output unit 1211.

Thus, in the case of the second exemplary embodiment, the image information with the subject information (position) appended thereto as metadata is output from the low-sensitivity tracking apparatus 1010L, and is then transmitted to the switching apparatus 1030 via the network 1050.

The target angle-of-view calculation unit 1212 calculates a target image capturing direction and angle of view based on the subject movement amount information, the movement amount threshold value $T_L$, and the subject position information transmitted from the movement amount calculation unit 1205 via the control determination unit 1210 and the target acquisition position information. Then, the target angle-of-view calculation unit 1212 outputs, to a PTZ speed calculation unit 1213, information about the calculated target image capturing direction and angle of view and the subject movement amount information transmitted via the control determination unit 1210.

The PTZ speed calculation unit 1213 calculates PT speeds based on the input subject movement amount information. The method of calculating PT speeds is similar to that in the first exemplary embodiment and is, therefore, omitted from description.

Next, a functional configuration of the switching apparatus 1030 illustrated in FIG. 13 is described. Furthermore, in FIG. 13, as other apparatuses, for example, connected to the switching apparatus 1030, the high-sensitivity tracking apparatus 1010H, the low-sensitivity tracking apparatus 1010L, and the output apparatus 1040 are also illustrated. The network 1050 is omitted from illustration.

The switching apparatus 1030 in the second exemplary embodiment selects any one of pieces of image information respectively transmitted from the high-sensitivity tracking apparatus 1010H and the low-sensitivity tracking apparatus 1010L, based on subject information (position and speed) and subject information (position) appended to each piece of image information and outputs the selected image information.

Pieces of image information respectively transmitted from the high-sensitivity tracking apparatus 1010H and the low-sensitivity tracking apparatus 1010L are input to an image input unit 1317 of the switching apparatus 1030. The image input unit 1317 outputs the received pieces of image information to a switching determination unit 1320.

The switching determination unit 1320 acquires subject speed information included in the subject information (position and speed) appended to the image information input from the high-sensitivity tracking apparatus 1010H. Moreover, the switching determination unit 1320 acquires subject position information included in the subject information (position) appended to the image information input from the low-sensitivity tracking apparatus 1010L. Then, the switching determination unit 1320 determines which of the pieces of image information respectively input from the high-sensitivity tracking apparatus 1010H and the low-sensitivity tracking apparatus 1010L to output, based on subject speed information input from the high-sensitivity tracking apparatus 1010H and subject position information input from the low-sensitivity tracking apparatus 1010L.

Specifically, in a case where subject information (position and speed) input from the high-sensitivity tracking apparatus 1010H is not appended to image information, the switching determination unit 1320 determines to output image information input from the high-sensitivity tracking apparatus 1010H.

On the other hand, in a case where subject information (position and speed) input from the high-sensitivity tracking apparatus 1010H is appended to image information, the switching determination unit 1320 determines whether subject speed information included in the subject information (position and speed) is higher than the trackable speed $S_R$ of the low-sensitivity tracking apparatus 1010L. Then, if it is determined that the subject speed information input from the high-sensitivity tracking apparatus 1010H is higher than the trackable speed $S_R$ of the low-sensitivity tracking apparatus 1010L, the switching determination unit 1320 determines to output image information input from the high-sensitivity tracking apparatus 1010H.

Moreover, if it is determined that the subject speed information is lower than or equal to the trackable speed $S_R$, the switching determination unit 1320 further determines whether there is subject position information input from the low-sensitivity tracking apparatus 1010L. Then, if it is determined that there is subject position information input from the low-sensitivity tracking apparatus 1010L, the switching determination unit 1320 determines to output image information input from the low-sensitivity tracking apparatus 1010L. Thus, in a case where the subject speed information input from the high-sensitivity tracking apparatus 1010H is lower than or equal to the trackable speed $S_R$ and there is subject position information input from the low-sensitivity tracking apparatus 1010L, the switching determination unit 1320 determines to output image information input from the low-sensitivity tracking apparatus 1010L. The switching determination unit 1320 outputs, to an image switching unit 1318, image switching information corresponding to a result of the above-mentioned determination processing, the image information input from the high-sensitivity tracking apparatus 1010H, and the image information input from the low-sensitivity tracking apparatus 1010L.

The image switching unit 1318 selects any one of the image information input from the high-sensitivity tracking apparatus 1010H and the image information input from the low-sensitivity tracking apparatus 1010L based on the image switching information and outputs the selected image information to an image output unit 1319. The image information output from the image output unit 1319 is transmitted to the output apparatus 1040.

Figure 14:
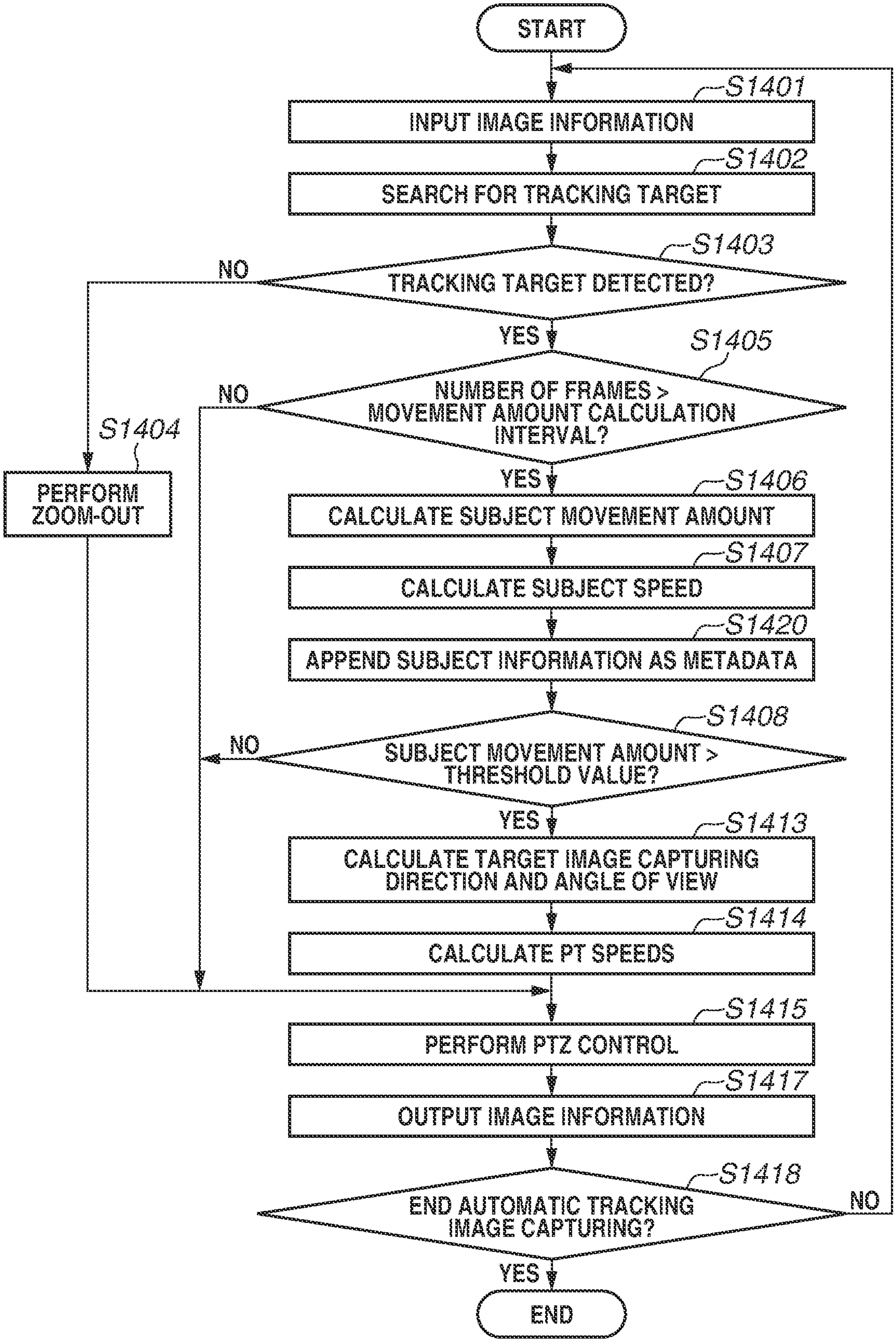
FIG. 14 is a flowchart of processing which is performed by the high-sensitivity tracking apparatus in the second exemplary embodiment.
Figure 15:
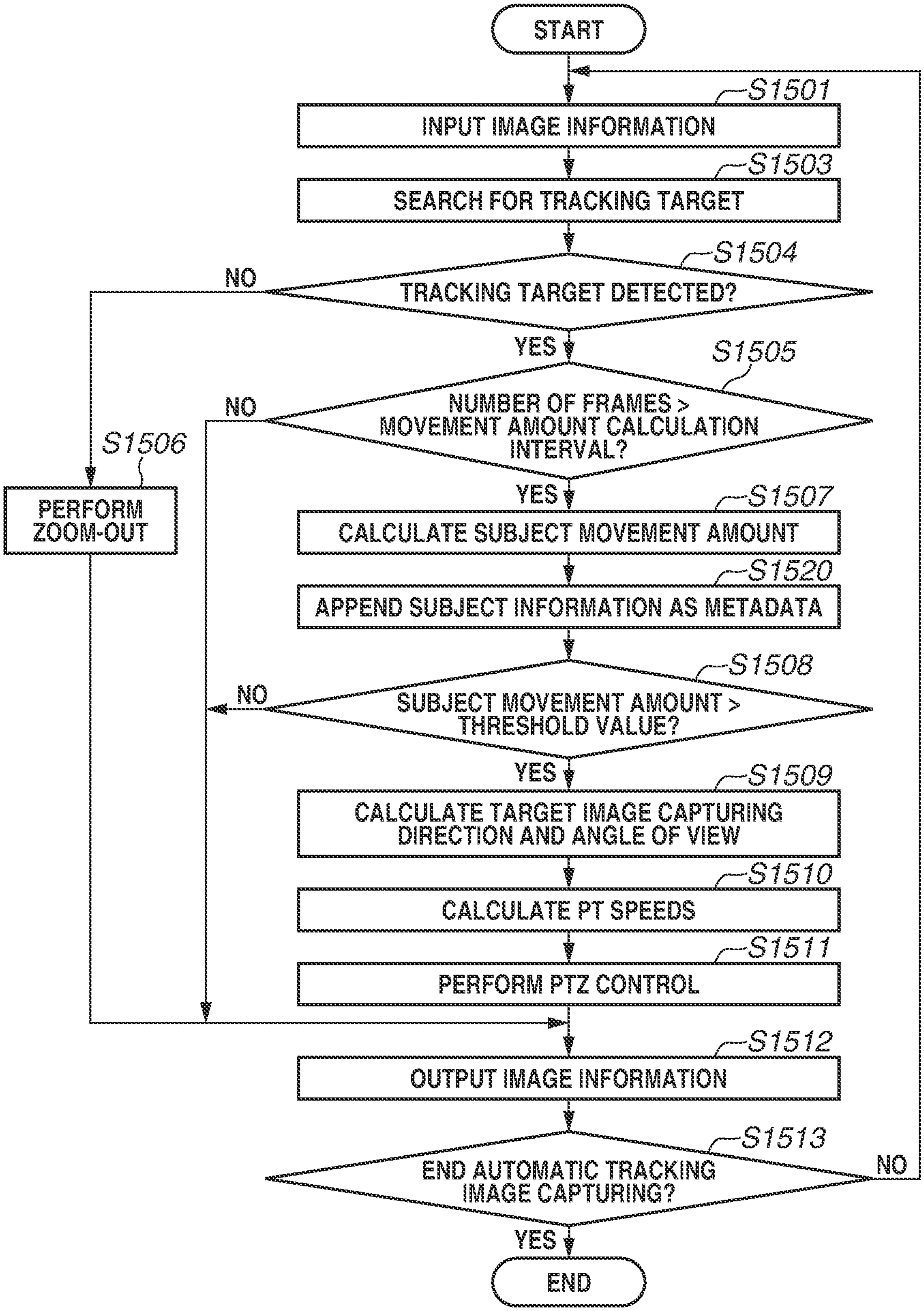
FIG. 15 is a flowchart of processing which is performed by the low-sensitivity tracking apparatus in the second exemplary embodiment.
Figure 16:
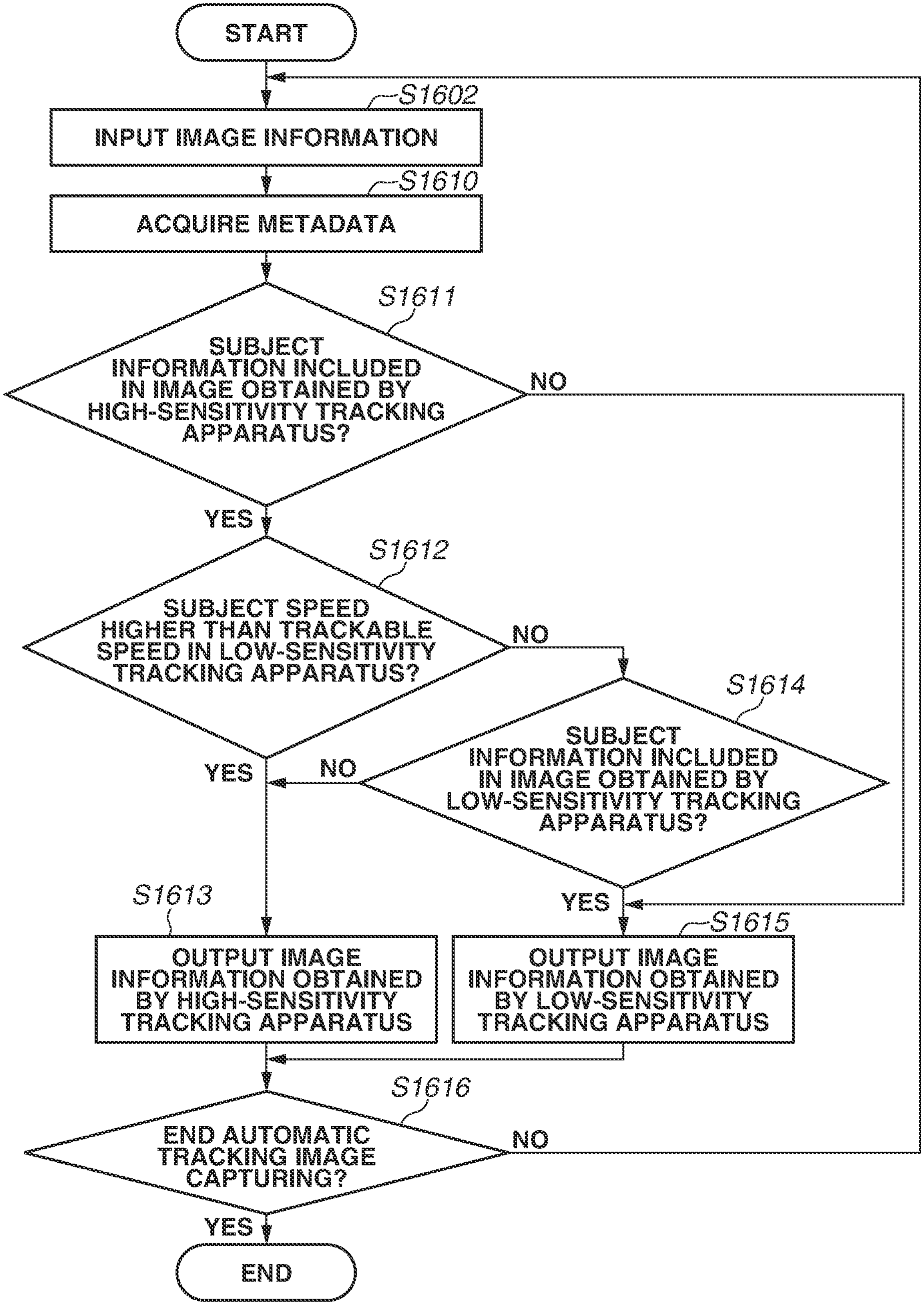
FIG. 16 is a flowchart of processing which is performed by the switching apparatus in the second exemplary embodiment.

FIG. 14 to FIG. 16 are flowcharts illustrating the flows of processing which are performed by the respective apparatuses in the automatic image capturing system 1000 according to the second exemplary embodiment illustrated in FIG. 11 to FIG. 13. FIG. 14 is a flowchart of processing which is performed by the high-sensitivity tracking apparatus 1010H configured as illustrated in FIG. 11, FIG. 15 is a flowchart of processing which is performed by the low-sensitivity tracking apparatus 1010L configured as illustrated in FIG. 12, and FIG. 16 is a flowchart of processing which is performed by the switching apparatus 1030 configured as illustrated in FIG. 13.

First, the flow of processing which is performed by the high-sensitivity tracking apparatus 1010H according to the second exemplary embodiment is described with reference to the flowchart of FIG. 14.

When started up by a user operation performed via, for example, an operation unit (not illustrated), in step S1401, the high-sensitivity tracking apparatus 1010H causes the image capturing apparatus 1101 to start image capturing for a moving image, so that image information input to the image input unit 1103 is output to the subject detection unit 1104.

Processing operations in step S1402 to step S1407 are similar to the processing operations in step S702 to step S707 in the first exemplary embodiment and are, therefore, omitted from description. However, in the case of the second exemplary embodiment, in step S1407, the speed calculation unit 1106 sets the calculated subject speed information and the subject position information input from the movement amount calculation unit 1105 as subject information (position and speed). The speed calculation unit 1106 outputs, to the control determination unit 1110, the subject information (position and speed) and the subject movement amount information and image information input from the movement amount calculation unit 1105. Then, the control determination unit 1110 determines whether to perform PTZ control, outputs information corresponding to a result of the determination to the target angle-of-view calculation unit 1112, and also outputs image information and subject information (position and speed) to the information appending unit 1120. Then, in the case of the second exemplary embodiment, after step S1407, the high-sensitivity tracking apparatus 1010H advances the processing to step S1420.

In step S1420, the information appending unit 1120 appends the subject information (position and speed) as metadata to the input image information. After that, the high-sensitivity tracking apparatus 1010H advances the processing to step S1408. Processing operations in step S1408 to step S1415 are similar to the processing operations in step S708 to step S715 illustrated in FIG. 7 in the first exemplary embodiment and are, therefore, omitted from description. However, in the case of the second exemplary embodiment, after step S1404, the high-sensitivity tracking apparatus 1010H advances the processing to step S1415.

In step S1417, the image output unit 1111 outputs the input image information to the switching apparatus 1030. After that, in step S1418, the high-sensitivity tracking apparatus 1010H determines whether an instruction for ending automatic tracking image capturing has been input by a user operation performed via an operation unit (not illustrated). Then, if it is determined that an instruction for ending automatic tracking image capturing has been input (YES in step S1418), the high-sensitivity tracking apparatus 1010H ends the processing in the flowchart of FIG. 14, and, if it is determined that an instruction for ending automatic tracking image capturing has not been input (NO in step S1418), the high-sensitivity tracking apparatus 1010H returns the processing to step S1401.

Next, the flow of processing which is performed by the low-sensitivity tracking apparatus 1010L is described with reference to the flowchart of FIG. 15.

When started up by a user operation performed via an operation unit (not illustrated), in step S1501, the low-sensitivity tracking apparatus 1010L causes the image capturing apparatus 1201 to start image capturing for a moving image, so that image information input to the image input unit 1203 is output to the subject detection unit 1204. Then, after step S1501, the low-sensitivity tracking apparatus 1010L advances the processing to step S1503.

Processing operations in step S1503 to step S1507 are similar to the processing operations in step S803 to step S807 illustrated in FIG. 8 in the first exemplary embodiment and are, therefore, omitted from description. However, in the case of the second exemplary embodiment, in step S1507, the movement amount calculation unit 1205 sets the subject position information as subject information (position). After step S1507, the low-sensitivity tracking apparatus 1010L advances the processing to step S1520.

In step S1520, the information appending unit 1220 appends subject information (position) as metadata to image information. After step S1520, the low-sensitivity tracking apparatus 1010L advances the processing to step S1508.

Processing operations in step S1508 to step S1513 are similar to the processing operations in step S808 to step S813 illustrated in FIG. 8 in the first exemplary embodiment and are, therefore, omitted from description.

Next, the flow of processing which is performed by the switching apparatus 1030 is described with reference to the flowchart of FIG. 16.

When started up by a user operation performed via an operation unit (not illustrated), the switching apparatus 1030 starts image output processing illustrated in the flowchart of FIG. 16. First, in step S1602, the image input unit 1317 outputs, to the switching determination unit 1320, respective pieces of image information respectively transmitted from the high-sensitivity tracking apparatus 1010H and the low-sensitivity tracking apparatus 1010L.

Next, in step S1610, the switching determination unit 1320 acquires information about metadata appended to the input image information. Additionally, in step S1611, the switching determination unit 1320 determines whether subject information (position and speed) transmitted from the high-sensitivity tracking apparatus 1010H is included in the metadata acquired in step S1610. Then, if it is determined by the switching determination unit 1320 that subject information (position and speed) transmitted from the high-sensitivity tracking apparatus 1010H is included in the acquired metadata (YES in step S1611), the switching apparatus 1030 advances the processing to step S1612. On the other hand, if it is determined that subject information (position and speed) transmitted from the high-sensitivity tracking apparatus 1010H is not included in the acquired metadata (NO in step S1611), the switching apparatus 1030 advances the processing to step S1615.

In step S1612, the switching determination unit 1320 determines whether subject speed information included in the subject information (position and speed) appended to image information input from the high-sensitivity tracking apparatus 1010H is higher than the trackable speed $S_R$ in the low-sensitivity tracking apparatus 1010L. Then, if it is determined that the subject speed information is higher than the trackable speed $S_R$ (YES in step S1612), the switching determination unit 1320 advances the processing to step S1613, and, on the other hand, if it is determined that the subject speed information is lower than or equal to the trackable speed $S_R$ (NO in step S1612), the switching determination unit 1320 advances the processing to step S1614.

In step S1613, the switching determination unit 1320 determines to select and output image information input from the high-sensitivity tracking apparatus 1010H and outputs image switching information indicating that effect to the image switching unit 1318. The image switching unit 1318 selects the image information input from the high-sensitivity tracking apparatus 1010H based on the image switching information and outputs the selected image information to the image output unit 1319. With this processing operation, the image output unit 1319 outputs, to the output apparatus 1040, the image information input from the high-sensitivity tracking apparatus 1010H.

Moreover, in step S1614, the switching determination unit 1320 determines whether subject information (position) input from the low-sensitivity tracking apparatus 1010L is included in the metadata acquired in step S1610. Then, if it is determined by the switching determination unit 1320 that subject information (position) input from the low-sensitivity tracking apparatus 1010L is included in the acquired metadata (YES in step S1614), the switching apparatus 1030 advances the processing to step S1615. On the other hand, if it is determined that subject information (position) input from the low-sensitivity tracking apparatus 1010L is not included in the acquired metadata (NO in step S1614), the switching apparatus 1030 advances the processing to step S1613.

In step S1615, the switching determination unit 1320 determines to select and output image information input from the low-sensitivity tracking apparatus 1010L and outputs image switching information indicating that effect to the image switching unit 1318. The image switching unit 1318 selects the image information input from the low-sensitivity tracking apparatus 1010L based on the image switching information and outputs the selected image information to the image output unit 1319. With this processing operation, the image output unit 1319 outputs, to the output apparatus 1040, the image information input from the low-sensitivity tracking apparatus 1010L.

After step S1613 or step S1615, the switching apparatus 1030 advances the processing to step S1616. In step S1616, the switching apparatus 1030 determines whether an instruction for stopping image switching processing has been input by a user operation performed via an operation unit (not illustrated). Then, if it is determined that an instruction for stopping image switching processing has been input (YES in step S1616), the switching apparatus 1030 ends the processing in the flowchart of FIG. 16, and, on the other hand, if it is determined that the instruction has not been input (NO in step S1616), the switching apparatus 1030 returns the processing to step S1602.

The automatic image capturing system 1000 in the second exemplary embodiment causes two tracking apparatuses, i.e., the low-sensitivity tracking apparatus 1010L, which smoothly tracks a subject, and the high-sensitivity tracking apparatus 1010H, which performs PTZ control even for sudden motion of a subject, to operate in cooperation with each other, thus performing automatic tracking image capturing of the same subject. Then, the automatic image capturing system 1000 selects any one of pieces of image information respectively obtained by the low-sensitivity tracking apparatus 1010L and the high-sensitivity tracking apparatus 1010H performing tracking of the same subject according to the subject speed and sets the selected image information as output image information. In the case of the second exemplary embodiment, based on respective pieces of subject information which the low-sensitivity tracking apparatus 1010L and the high-sensitivity tracking apparatus 1010H have appended to respective pieces of image information, the switching apparatus 1030 determines which of the pieces of image information to select and output. This enables even the automatic image capturing system 1000 in the second exemplary embodiment to output an automatically tracked image which is obtained without missing sudden motion or rapid motion of a subject and which is smooth, as with the case of the first exemplary embodiment.

Next, an information processing apparatus according to a third exemplary embodiment is described.

Figure 17:
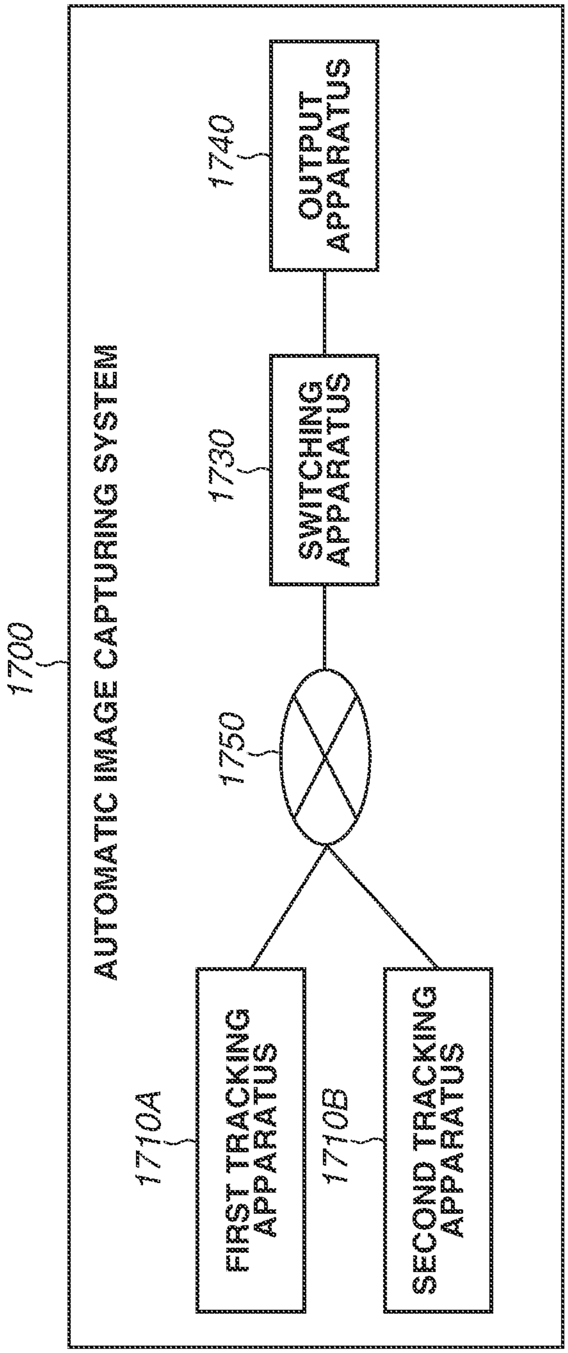
FIG. 17 is a diagram illustrating a configuration example of an automatic image capturing system according to a third exemplary embodiment.

FIG. 17 is a diagram illustrating an outline configuration of an automatic image capturing system 1700, which is an application example of the information processing apparatus according to the third exemplary embodiment.

The automatic image capturing system 1700 in the third exemplary embodiment illustrated in FIG. 17 is configured to include a plurality of automatic tracking apparatuses each capable of changing a tracking sensitivity thereof (in the example illustrated in FIG. 17, a first tracking apparatus 1710A and a second tracking apparatus 1710B), a switching apparatus 1730, and an output apparatus 1740. The first tracking apparatus 1710A, the second tracking apparatus 1710B, and the switching apparatus 1730 are connected to each other via a network 1750.

In the automatic image capturing system 1700 according to the third exemplary embodiment, each of the first tracking apparatus 1710A and the second tracking apparatus 1710B is configured to be able to change a tracking sensitivity thereof, and the first tracking apparatus 1710A and the second tracking apparatus 1710B are controlled to perform automatic tracking image capturing of a subject. Moreover, each of the first tracking apparatus 1710A and the second tracking apparatus 1710B is equipped with an image capturing apparatus (such as an IP camera), which has a zooming function, and an electrically driven tripod head, which is capable of moving the image capturing apparatus in PT directions.

As with the tracking apparatuses in the above-described exemplary embodiments, both the first tracking apparatus 1710A and the second tracking apparatus 1710B track the same subject. While each of the first tracking apparatus 1710A and the second tracking apparatus 1710B is capable of changing a tracking sensitivity thereof, as initially set tracking sensitivities, one of the tracking sensitivities is assumed to be set to high sensitivity and the other of the tracking sensitivities is assumed to be set to low sensitivity. In the description of the third exemplary embodiment, as initially set tracking sensitivities, the first tracking apparatus 1710A is assumed to be set to high sensitivity and the second tracking apparatus 1710B is assumed to be set to low sensitivity.

In a case where the same subject detected by both the first tracking apparatus 1710A and the second tracking apparatus 1710B has started to move after entering into a subject stopped state in which the subject does not move for a given period of time, the first tracking apparatus 1710A and the second tracking apparatus 1710B mutually transmit and receive subject information (position and speed) indicating the position and motion of the subject to and from each other. Additionally, the first tracking apparatus 1710A and the second tracking apparatus 1710B determine whether there is a difference in subject movement amount based on the respective pieces of subject information (position and speed). Then, if there is a difference in subject movement amount, the tracking apparatus which has detected a larger subject movement amount sets the tracking sensitivity thereof to high sensitivity, and, on the other hand, the tracking apparatus which has detected a smaller subject movement amount sets the tracking sensitivity thereof to low sensitivity. Furthermore, if there is no difference in subject movement amount, the first tracking apparatus 1710A and the second tracking apparatus 1710B maintain the respective tracking sensitivity settings with no change. Details of configurations and operations of the first tracking apparatus 1710A and the second tracking apparatus 1710B are described below.

Furthermore, even in the third exemplary embodiment, as with those described in the above-described exemplary embodiments, the tracking sensitivity settings of the tracking device the tracking sensitivity of which is set to high sensitivity are assumed to be the movement amount calculation interval $M_H$ (the number of frames), the movement amount threshold value $T_H$, and the PT speed coefficients $S_H(p, t)$. On the other hand, the tracking sensitivity settings of the tracking device the tracking sensitivity of which is set to low sensitivity are assumed to be the movement amount calculation interval $M_L$ (the number of frames), the movement amount threshold value $T_L$, and the PT speed coefficients $S_L(p, t)$. Moreover, as with those described in the above-described exemplary embodiments, the tracking sensitivity at the time of the high sensitivity setting is the maximum sensitivity of tracking sensitivities at which the tracking apparatus is able to track a subject, and, on the other hand, the maximum speed of subject speeds at which the tracking apparatus is able to track a subject at the time of the low sensitivity setting is assumed to be the trackable speed $S_R$. Moreover, even in the third exemplary embodiment, the movement amount calculation interval $M_H$, the movement amount threshold value $T_H$, and the PT speed coefficients $S_H(p, t)$ and the movement amount calculation interval $M_L$, the movement amount threshold value $T_L$, and the PT speed coefficients $S_L(p, t)$ are assumed to have relationships expressed by the above-mentioned formulae (1) to (3).

Then, from among the first tracking apparatus 1710A and the second tracking apparatus 1710B, the tracking apparatus which has been set to high sensitivity performs image switching determination based on the subject speed as with the example of the high-sensitivity tracking apparatus 110H in the first exemplary embodiment, and then outputs image information and image switching information to the switching apparatus 1730. On the other hand, the racking apparatus which has been set to low sensitivity performs automatic tracking based on information representing the position and motion of a subject detected by low-sensitivity tracking or subject information (position and speed) transmitted from the tracking apparatus which has been set to high sensitivity, and then outputs image information to the switching apparatus 1730.

The switching apparatus 1730 selects any one of respective pieces of image information transmitted from the first tracking apparatus 1710A and the second tracking apparatus 1710B via the network 1750, and outputs the selected image information to the output apparatus 1740. In the case of the third exemplary embodiment, the switching apparatus 1730 performs selection and outputting of image information based on image switching information transmitted from the tracking apparatus which has been set to high sensitivity from among the first tracking apparatus 1710A and the second tracking apparatus 1710B. Details of a configuration of the switching apparatus 1730 and image switching processing are described below.

The output apparatus 1740, for example, displays image information transmitted from the switching apparatus 1730.

Furthermore, the output apparatus 1740 is also able to record image information transmitted from the switching apparatus 1730.

Furthermore, while, in the example illustrated in FIG. 17, a set including the first tracking apparatus 1710A and the second tracking apparatus 1710B is illustrated as an example, as with the above-described exemplary embodiments, a plurality of sets each including such tracking apparatuses can be prepared. Even in the third exemplary embodiment, the plurality of sets each including such tracking apparatuses can be configured to track respective different tracking targets (the tracking target for each set being the same subject).

Moreover, hardware configurations respectively applicable to the first tracking apparatus 1710A, the second tracking apparatus 1710B, and the switching apparatus 1730 are similar to the configuration illustrated in FIG. 2 described above and are, therefore, omitted from description and illustration.

Figure 18:
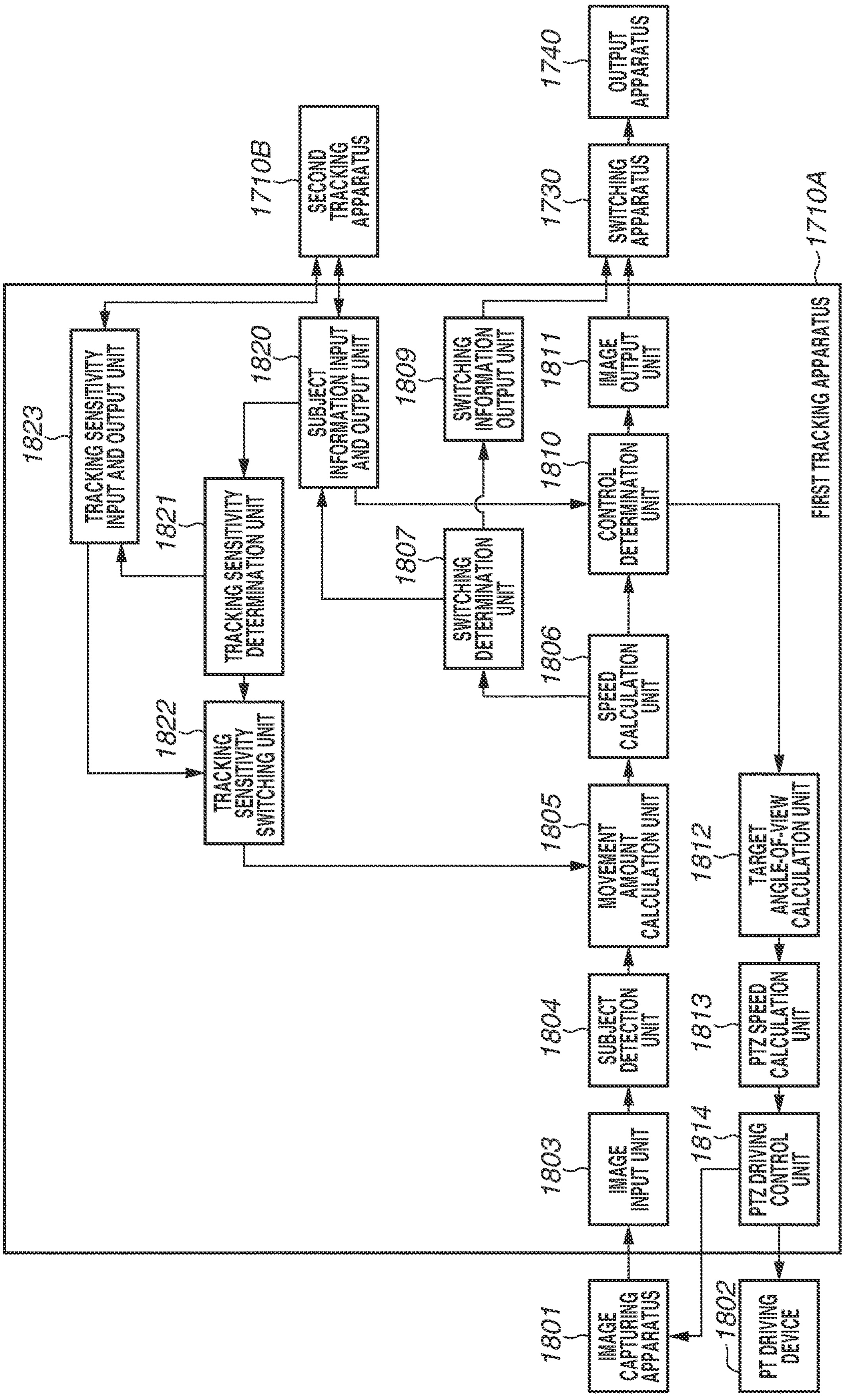
FIG. 18 is a diagram illustrating a configuration example of a first tracking apparatus in the third exemplary embodiment.
Figure 19:
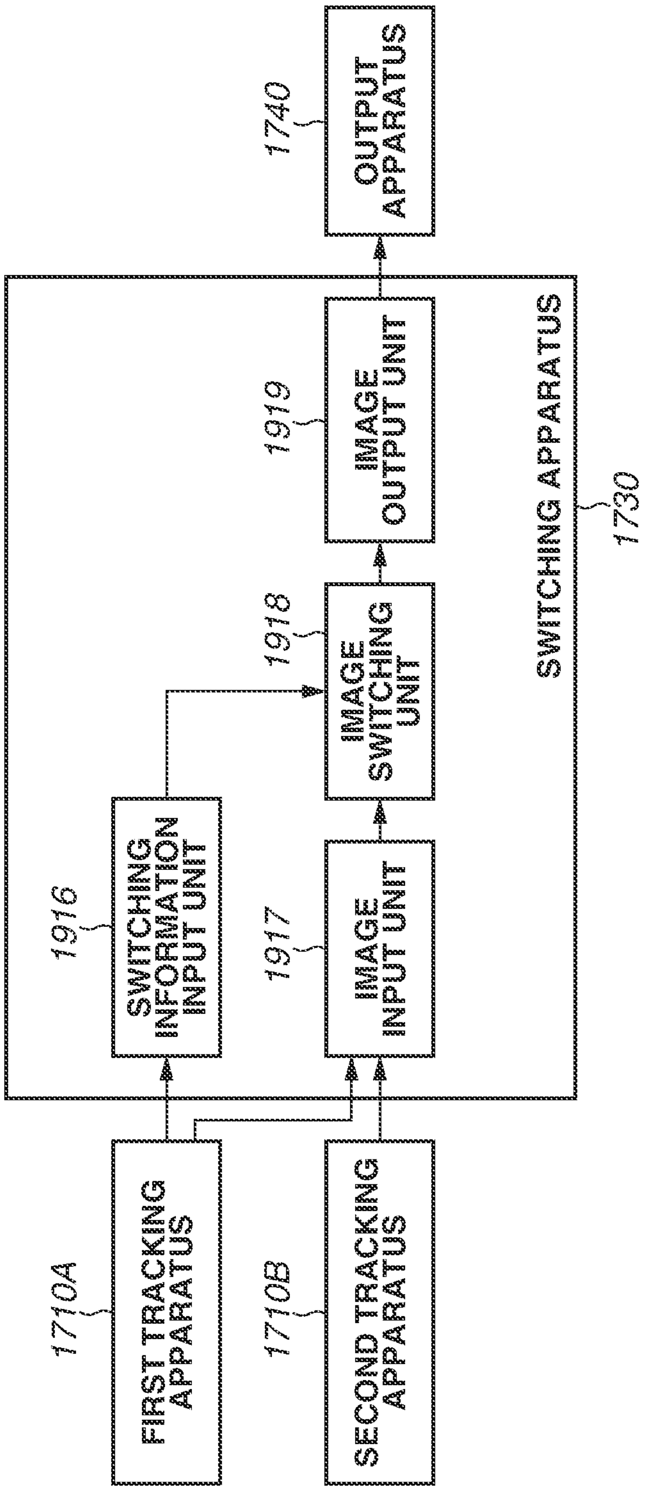
FIG. 19 is a diagram illustrating a configuration example of a switching apparatus in the third exemplary embodiment.

FIG. 18 and FIG. 19 are functional block diagrams illustrating, for example, respective functional units which are configured by, for example, the CPU 211 illustrated in FIG. 2 executing an information processing program (automatic tracking image capturing control program) according to the third exemplary embodiment.

FIG. 18 is a diagram illustrating a functional configuration of the first tracking apparatus 1710A in the third exemplary embodiment. Furthermore, the functional configuration of the second tracking apparatus 1710B is similar to that illustrated in FIG. 18 and is, therefore, omitted from description and illustration. Moreover, FIG. 19 is a diagram illustrating a functional configuration of the switching apparatus 1730. Furthermore, while the respective functional units illustrated in FIG. 18 and FIG. 19 are assumed to be functional units configured by the CPU 211 illustrated in FIG. 2 executing an automatic tracking image capturing control program according to the third exemplary embodiment, a part or the whole of the respective functional units illustrated in FIG. 18 and FIG. 19 can be implemented as a dedicated hardware circuit. Moreover, while, even in the example illustrated in the third exemplary embodiment, the first tracking apparatus 1710A, the second tracking apparatus 1710B, and the switching apparatus 1730 have respective different configurations, these apparatuses can be integrated into one apparatus configuration, as with that described in the above-described exemplary embodiments.

First, a functional configuration of the first tracking apparatus 1710A illustrated in FIG. 18 is described. Furthermore, in FIG. 18, as other apparatuses, for example, connected to the first tracking apparatus 1710A, an image capturing apparatus 1801, a PT driving device 1802, the second tracking apparatus 1710B, the switching apparatus 1730, and the output apparatus 1740 are also illustrated. The network 1750 is omitted from illustration. Moreover, the image capturing apparatus 1801 and the PT driving device 1802 are similar to the image capturing apparatus and the PT driving device in the above-described exemplary embodiments, and are, therefore, omitted from description. Moreover, an image input unit 1803 to a switching determination unit 1807 and a switching information output unit 1809 to a PTZ driving control unit 1814 are similar to the image input unit 303 to the switching determination unit 307 and the switching information output unit 309 to the PTZ driving control unit 314 illustrated in FIG. 3, respectively, and are, therefore, omitted from description. Furthermore, while FIG. 3 illustrates a configuration of the high-sensitivity tracking apparatus, in the first tracking apparatus 1710A, even in a case where the tracking sensitivity is set to low sensitivity, processing operations similar to those in the example illustrated in FIG. 3 are performed in the image input unit 1803 to the switching determination unit 1807 and the switching information output unit 1809 to the PTZ driving control unit 1814.

Moreover, in the third exemplary embodiment, depending on to which of high sensitivity and low sensitivity the tracking sensitivity of the first tracking apparatus 1710A is set, a subject information input and output unit 1820 performs respective different processing operations as follows.

In a case where the tracking sensitivity of the first tracking apparatus 1710A is set to high sensitivity, upon receiving, as an input, subject information (position and speed) from the switching determination unit 1807, the subject information input and output unit 1820 outputs the received subject information (position and speed) to a tracking sensitivity determination unit 1821. Moreover, upon receiving, as an input, subject information (position and speed) from the second tracking apparatus 1710B, the subject information input and output unit 1820 outputs the received subject information (position and speed) to the tracking sensitivity determination unit 1821. Moreover, the subject information input and output unit 1820 outputs, to the second tracking apparatus 1710B, subject information (position and speed) input from the switching determination unit 1807.

In a case where the tracking sensitivity of the first tracking apparatus 1710A is set to low sensitivity, upon receiving, as an input, subject information (position and speed) from the second tracking apparatus 1710B, the subject information input and output unit 1820 outputs the received subject information (position and speed) to a control determination unit 1810 and the tracking sensitivity determination unit 1821. Moreover, the subject information input and output unit 1820 outputs, to the second tracking apparatus 1710B, subject information (position and speed) input from the switching determination unit 1807.

The tracking sensitivity determination unit 1821 determines whether to change the tracking sensitivity, based on the subject information (position and speed) input from the subject information input and output unit 1820. In this case, based on a history of the input subject information (position and speed), the tracking sensitivity determination unit 1821 detects the starting of movement of a subject after the subject has stopped for more than or equal to a predetermined time. Upon detecting the starting of movement of the subject, the tracking sensitivity determination unit 1821 determines whether there is a difference in movement amount of the same subject, based on subject information (position and speed) obtained by the first tracking apparatus 1710A and subject information (position and speed) obtained by the second tracking apparatus 1710B. Then, if the amount of movement at the starting of movement of the same subject obtained by the first tracking apparatus 1710A is larger than that obtained by the second tracking apparatus 1710B, the tracking sensitivity determination unit 1821 outputs tracking sensitivity information indicating high sensitivity setting to a tracking sensitivity switching unit 1822 and a tracking sensitivity input and output unit 1823.

On the other hand, if the amount of movement at the starting of movement of the same subject obtained by the first tracking apparatus 1710A is smaller than that obtained by the second tracking apparatus 1710B, the tracking sensitivity determination unit 1821 outputs tracking sensitivity information indicating low sensitivity setting to the tracking sensitivity switching unit 1822 and the tracking sensitivity input and output unit 1823.

Moreover, in the third exemplary embodiment, depending on to which of high sensitivity and low sensitivity the tracking sensitivity of the first tracking apparatus 1710A is set, the tracking sensitivity input and output unit 1823 performs respective different processing operations as follows.

In a case where the tracking sensitivity of the first tracking apparatus 1710A is set to high sensitivity, upon receiving, as an input, tracking sensitivity information from the tracking sensitivity determination unit 1821, the tracking sensitivity input and output unit 1823 outputs the received tracking sensitivity information to the second tracking apparatus 1710B.

In a case where the tracking sensitivity of the first tracking apparatus 1710A is set to low sensitivity, upon receiving, as an input, tracking sensitivity information from the second tracking apparatus 1710B, the tracking sensitivity input and output unit 1823 outputs the received tracking sensitivity information to the tracking sensitivity switching unit 1822.

Upon receiving, as an input, the tracking sensitivity information, the tracking sensitivity switching unit 1822 sets parameters for tracking sensitivity of the first tracking apparatus 1710A according to tracking sensitivity setting indicated by the received tracking sensitivity information. For example, if the tracking sensitivity information indicates high sensitivity setting, the tracking sensitivity switching unit 1822 sets the parameters for the tracking sensitivity of the first tracking apparatus 1710A to high sensitivity setting. On the other hand, if the tracking sensitivity information indicates low sensitivity setting, the tracking sensitivity switching unit 1822 sets the parameters for the tracking sensitivity of the first tracking apparatus 1710A to low sensitivity setting.

Next, a functional configuration of the switching apparatus 1730 illustrated in FIG. 19 is described. Furthermore, in FIG. 19, as other apparatuses, for example, connected to the switching apparatus 1730, the first tracking apparatus 1710A, the second tracking apparatus 1710B, and the output apparatus 1740 are also illustrated. The network 1750 is omitted from illustration.

In the description of the example illustrated in FIG. 19, the tracking sensitivity of the first tracking apparatus 1710A is assumed to be set to high sensitivity and, on the other hand, the tracking sensitivity of the second tracking apparatus 1710B is assumed to be set to low sensitivity.

In a case where the tracking sensitivity of the first tracking apparatus 1710A is set to high sensitivity, as mentioned above, image switching information is transmitted from the first tracking apparatus 1710A, and the transmitted image switching information is input to a switching information input unit 1916 of the switching apparatus 1730. Moreover, image information transmitted from the image output unit 1811 of the first tracking apparatus 1710A and image information transmitted from the image output unit 1811 of the second tracking apparatus 1710B are input to an image input unit 1917 of the switching apparatus 1730.

Upon receiving, as an input, the image switching information transmitted from the first tracking apparatus 1710A with the tracking sensitivity thereof set to high sensitivity, the switching information input unit 1916 outputs the input image switching information to an image switching unit 1918.

Upon receiving the image switching information as an input, the image switching unit 1918 selects any one of image information input from the first tracking apparatus 1710A and image information input from the second tracking apparatus 1710B based on the input image switching information and then outputs the selected image information to an image output unit 1919.

The image output unit 1919 outputs, to the output apparatus 1740, the image information input from the image switching unit 1918.

Figure 20:
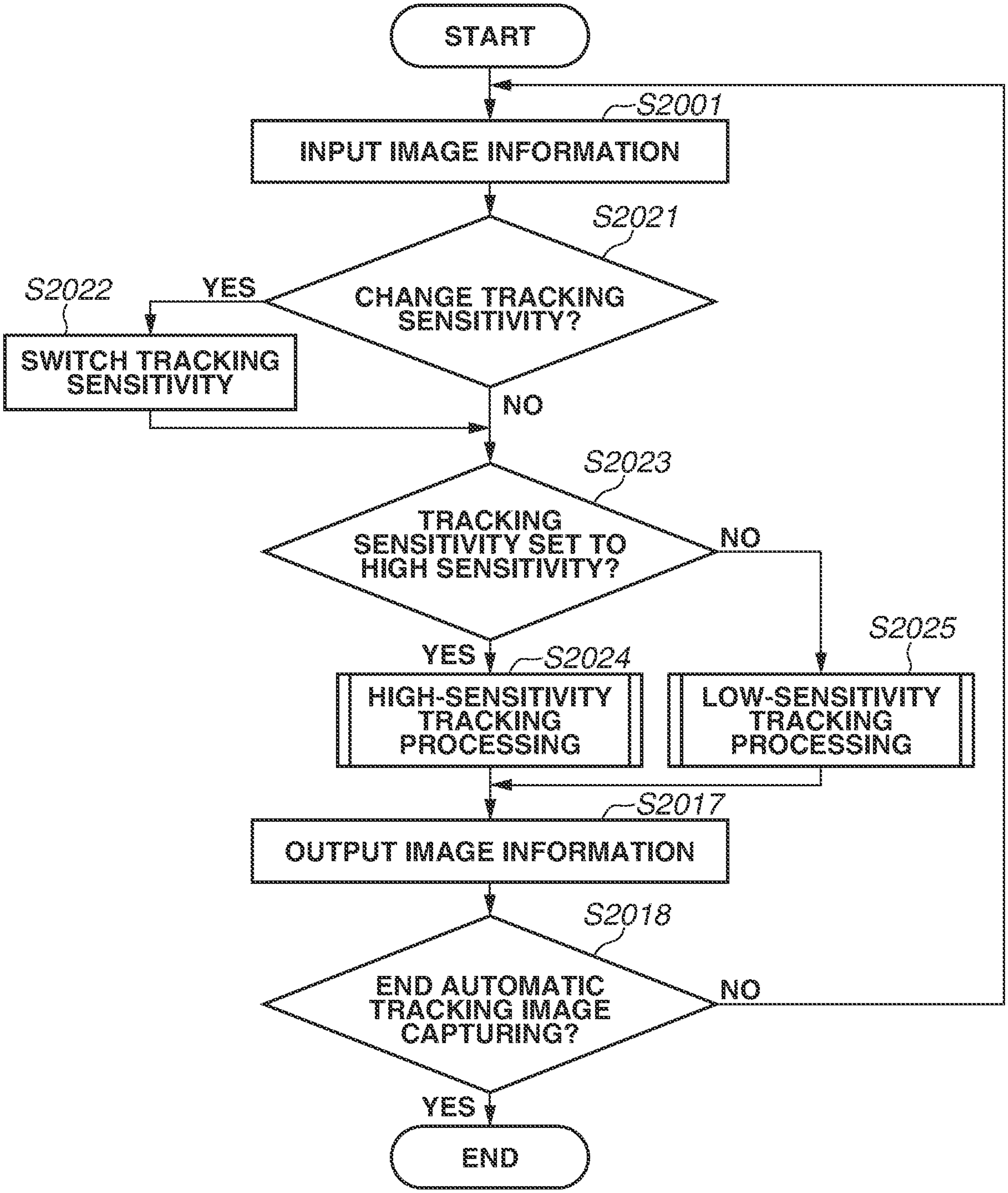
FIG. 20 is a flowchart of processing which is performed by the first tracking apparatus in the third exemplary embodiment.
Figure 21:
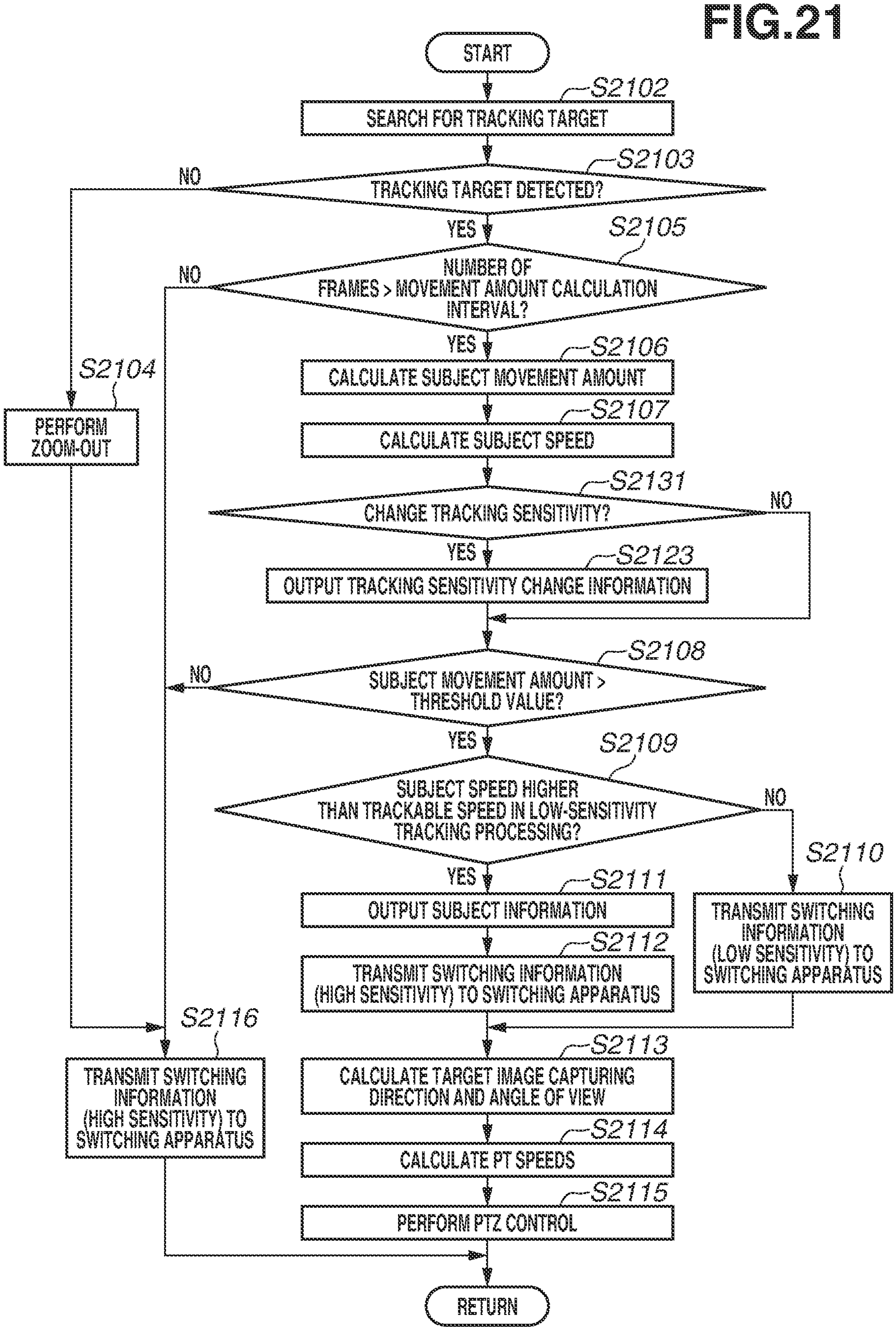
FIG. 21 is a flowchart of high-sensitivity tracking processing in the third exemplary embodiment.
Figure 22:
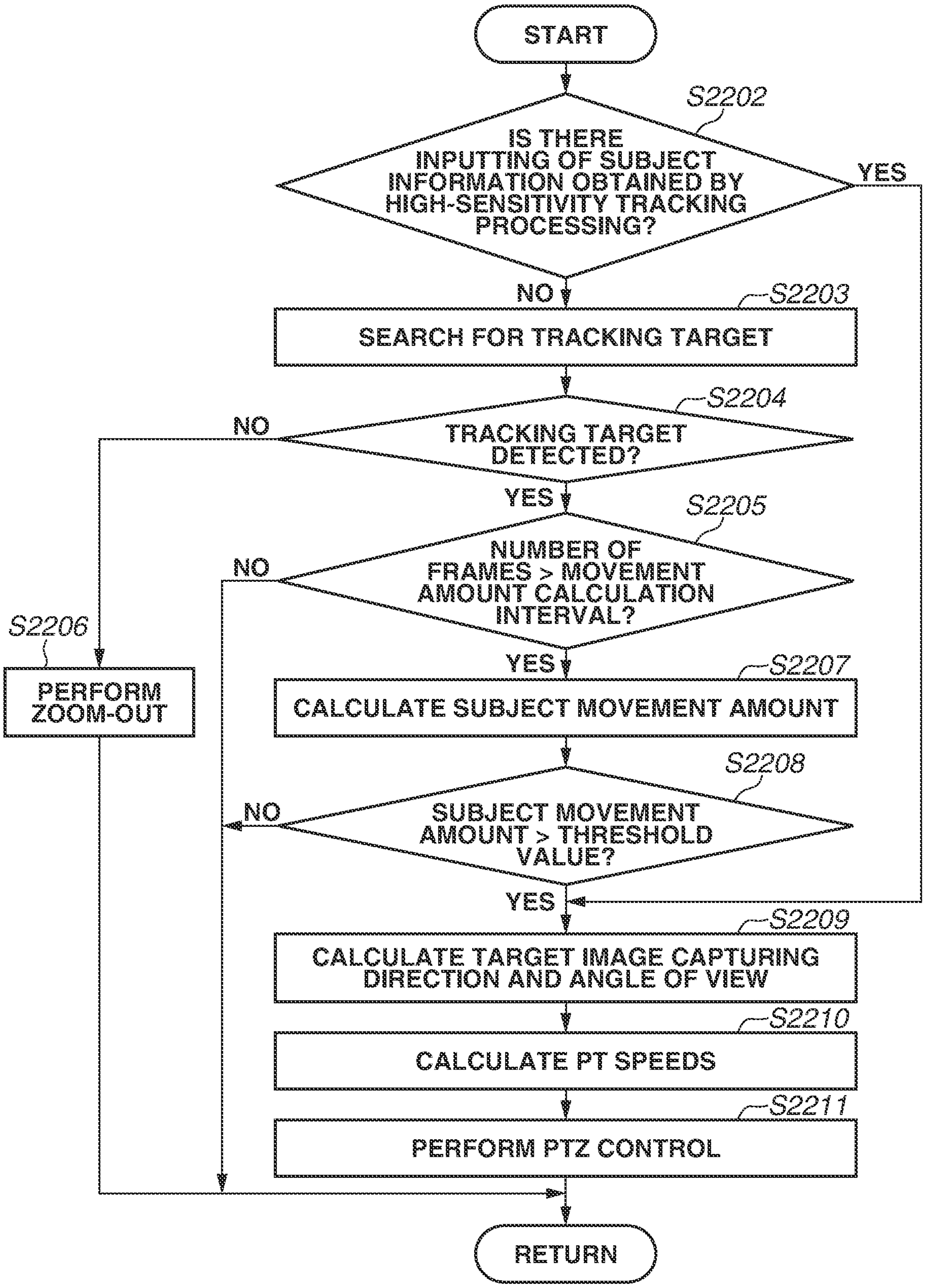
FIG. 22 is a flowchart of low-sensitivity tracking processing in the third exemplary embodiment.

FIG. 20 to FIG. 22 are flowcharts illustrating the flows of processing which are performed by the respective apparatuses in the automatic image capturing system 1700 according to the third exemplary embodiment illustrated in FIG. 18 and FIG. 19. FIG. 20 is a flowchart of processing which is performed by the first tracking apparatus 1710A or the second tracking apparatus 1710B configured as illustrated in FIG. 18. FIG. 21 is a flowchart illustrating the detailed flow of processing in step S2024 illustrated in FIG. 20, and FIG. 22 is a flowchart illustrating the detailed flow of processing in step S2025 illustrated in FIG. 20. Furthermore, processing which is performed by the switching apparatus 1730 is similar to the processing in the flowchart of FIG. 9 in the first exemplary embodiment and is, therefore, omitted from description and illustration.

First, the flow of processing which is performed by the first tracking apparatus 1710A or the second tracking apparatus 1710B in the third exemplary embodiment is described with reference to the flowchart of FIG. 20. Furthermore, since processing which is performed by the first tracking apparatus 1710A and processing which is performed by the second tracking apparatus 1710B are similar to each other, here, processing which is performed by the first tracking apparatus 1710A is mainly described as an example.

The first tracking apparatus 1710A is assumed to have been started up by a user operation performed via an operation unit (not illustrated). Furthermore, in the third exemplary embodiment, the initial setting of tracking sensitivity at the time of start-up of the first tracking apparatus 1710A is assumed to be high sensitivity and the initial setting of tracking sensitivity at the time of start-up of the second tracking apparatus 1710B is assumed to be low sensitivity. In step S2001, the first tracking apparatus 1710A causes the image capturing apparatus 1801 to start image capturing for a moving image, so that image information input to the image input unit 1803 is output to the subject detection unit 1804.

Next, in step S2021, the tracking sensitivity determination unit 1821 determines whether to change the tracking sensitivity. In a case where the first tracking apparatus 1710A is immediately after being started up, since changing of the tracking sensitivity is not performed, the tracking sensitivity determination unit 1821 determines not to change the tracking sensitivity (NO in step S2021), and then advances the processing to step S2023. Furthermore, even in the second tracking apparatus 1710B immediately after start-up thereof, similarly, in step S2023, it is determined not to change the tracking sensitivity.

In step S2023, the tracking sensitivity determination unit 1821 determines whether the tracking sensitivity is currently set to high sensitivity. Since the tracking sensitivity of the first tracking apparatus 1710A immediately after start-up thereof is set to high sensitivity in the initial setting, the tracking sensitivity determination unit 1821 determines that the tracking sensitivity is currently set to high sensitivity (YES in step S2023), and then outputs tracking sensitivity information indicating high sensitivity setting to the tracking sensitivity switching unit 1822. With regard to the tracking sensitivity switching unit 1822 at this time, parameters for the tracking sensitivity are assumed to be the movement amount calculation interval $M_H$, the movement amount threshold value $T_H$, and the PT speed coefficients $S_H(p, t)$. Then, the first tracking apparatus 1710A advances the processing to step S2024. Furthermore, in the case of the second tracking apparatus 1710B immediately after start-up thereof, since the initial setting is low sensitivity setting, in step S2023, it is determined that the tracking sensitivity is currently set to low sensitivity (NO in step S2023), so that tracking sensitivity information indicting low sensitivity setting is output. In this case, with regard to the second tracking apparatus 1710B, parameters for the tracking sensitivity are the movement amount calculation interval $M_L$, the movement amount threshold value $T_L$, and the PT speed coefficients $S_L(p, t)$. Then, in the case of the second tracking apparatus 1710B, the second tracking apparatus 1710B advances the processing to step S2025.

In step S2024, the first tracking apparatus 1710A performs high-sensitivity tracking processing for a case where the tracking sensitivity is set to high sensitivity. The high-sensitivity tracking processing in step S2024 is described below with reference to the flowchart of FIG. 21. Then, after step S2024, the first tracking apparatus 1710A advances the processing to step S2017. Furthermore, When the second tracking apparatus 1710B immediately after being started up advances the processing to step S2025, the second tracking apparatus 1710B performs low-sensitivity tracking processing for a case where the tracking sensitivity is set to low sensitivity. The low-sensitivity tracking processing in step S2025 is described below with reference to the flowchart of FIG. 22. Then, after step S2025, the second tracking apparatus 1710B advances the processing to step S2017.

In step S2017, image information is output from the image output unit 1811 of the first tracking apparatus 1710A. With regard to the second tracking apparatus 1710B, similarly, image information is also output.

Next, in step S2018, the first tracking apparatus 1710A determines whether an instruction for stopping automatic tracking image capturing has been input by a user operation performed via an operation unit (not illustrated). Then, if it is determined that an instruction for stopping automatic tracking image capturing has been input (YES in step S2018), the first tracking apparatus 1710A ends the processing in the flowchart of FIG. 20, and, on the other hand, if it is determined that the instruction has not been input (NO in step S2018), the first tracking apparatus 1710A returns the processing to step S2001. With regard to the second tracking apparatus 1710B, similarly, a determination as to whether to end automatic tracking image capturing is performed.

Then, if, in step S2021, it is determined to change the tracking sensitivity (YES in step S2021), the tracking sensitivity determination unit 1821 advances the processing to step S2022. The determination as to whether to change the tracking sensitivity is performed, as mentioned above, based on the subject information (position and speed) input to the tracking sensitivity determination unit 1821. When determining to change the tracking sensitivity, the tracking sensitivity determination unit 1821 outputs, to the tracking sensitivity switching unit 1822, tracking sensitivity information indicating a tracking sensitivity to which the current tracking sensitivity is to be changed, and, then, the first tracking apparatus 1710A advances the processing to step S2022.

In step S2022, the tracking sensitivity switching unit 1822 performs tracking sensitivity switching processing for changing the tracking sensitivity according to the tracking sensitivity information input from the tracking sensitivity determination unit 1821. Thus, in a case where the tracking sensitivity information indicates low sensitivity setting, the tracking sensitivity switching unit 1822 sets the parameters for the tracking sensitivity to the movement amount calculation interval $M_L$, the movement amount threshold value $T_L$, and the PT speed coefficients $S_L(p, t)$ for the time of tracking. After that, the first tracking apparatus 1710A advances the processing to step S2023. Furthermore, with regard to the second tracking apparatus 1710B, in a case where the tracking sensitivity information has become indicating high sensitivity setting, in the second tracking apparatus 1710B, parameters for the tracking sensitivity are set to the movement amount calculation interval $M_H$, the movement amount threshold value $T_H$, and the PT speed coefficients $S_H(p, t)$.

After that, in step S2023, a determination as to whether the tracking sensitivity is set to high sensitivity is performed as with that described above.

Next, processing in step S2024 illustrated in FIG. 20 is described with reference to the flowchart of FIG. 21. Furthermore, processing operations in step S2102 to step S2107 in the flowchart of FIG. 21 are almost similar to the processing operations in step S702 to step S707 illustrated in FIG. 7, and are, therefore, omitted from description. After step S2107, the first tracking apparatus 1710A advances the processing to step S2131. Moreover, processing operations in step S2108 to step S2116 in the flowchart of FIG. 21 are almost similar to the processing operations in step S708 to step S716 illustrated in FIG. 7, and are, therefore, omitted from description. However, in step S2111, the subject information input and output unit 1820 outputs subject information (position and speed) to the other tracking apparatus (in this case, the second tracking apparatus 1710B). Furthermore, after step S2115 or step S2116, the first tracking apparatus 1710A advances the processing to step S2017.

If, in step S2131, it is determined to change the tracking sensitivity in determination processing in step S2021 illustrated in FIG. 20 (YES in step S2131), then in step S2123, the tracking sensitivity determination unit 1821 outputs tracking sensitivity information indicating a tracking sensitivity to which the current tracking sensitivity is to be changed. On the other hand, if it is determined not to change the tracking sensitivity in determination processing in step S2021 illustrated in FIG. 20 (NO in step S2131), the tracking sensitivity determination unit 1821 advances the processing to step S2108.

Next, processing in step S2025 illustrated in FIG. 20 is described with reference to the flowchart of FIG. 22.

While, in step S2025 illustrated in FIG. 20, the first tracking apparatus 1710A performs processing illustrated in the flowchart of FIG. 22, processing operations in step S2202 to step S2211 in the flowchart of FIG. 22 are almost similar to the processing operations in step S802 to step S811 illustrated in FIG. 8, and are, therefore, omitted from description. However, in step S2202, the subject information input and output unit 1820 determines whether there is inputting of subject information (position and speed) obtained by the tracking apparatus which performs high-sensitivity tracking processing. Moreover, after step S2206 or step S2211, if, in step S2205, it is determined that the number of image frames is less than or equal to the movement amount calculation interval (NO in step S2205), or if, in step S2208, it is determined that the subject movement amount is less than or equal to the movement amount threshold value (NO in step S2208), the first tracking apparatus 1710A advances the processing to step S2017.

In the automatic image capturing system 1700 in the third exemplary embodiment, each of the first tracking apparatus 1710A and the second tracking apparatus 1710B is configured to be able to change the tracking sensitivity. Then, if there occurs a difference in movement amount at the time of starting of movement of the same subject after being stopped, the automatic image capturing system 1700 sets the tracking sensitivity of the tracking apparatus which has detected the larger movement amount to high sensitivity and sets the tracking sensitivity of the tracking apparatus which has detected the smaller movement amount to low sensitivity. Then, the automatic image capturing system 1700 selects any one of pieces of image information respectively obtained by the first tracking apparatus 1710A and the second tracking apparatus 1710B tracking the same subject, and then sets the selected image information as output image information. This enables even the automatic image capturing system 1700 in the third exemplary embodiment to output an automatically tracked image which is obtained without missing sudden motion or rapid motion of a subject and which is smooth, as with the cases of the first and second exemplary embodiments.

The present disclosure can also be implemented by processing for supplying a program for implementing one or more functions of the above-described exemplary embodiments to a system or apparatus via a network or a storage medium and causing one or more processors included in a computer of the system or apparatus to read out and execute the program. Moreover, the present disclosure can also be implemented by a circuit which implements one or more functions of the above-described exemplary embodiments (for example, an application specific integrated circuit (ASIC)). Each of the above-described exemplary embodiments merely illustrates a specific example for implementing the present disclosure, and these exemplary embodiments should not be construed to limit the technical scope of the present disclosure. Thus, the present disclosure can be embodied in various forms without departing from the technical scope thereof or the principal features thereof.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-171319 filed Oct. 26, 2022, which is hereby incorporated by reference herein in its entirety.

What is claimed is:

1. An information processing apparatus comprising:

at least one memory storing instructions; and at least one processor executing the stored instructions to:

acquire a first image captured by a first image capturing apparatus which tracks a subject at a first tracking sensitivity;

acquire a second image captured by a second image capturing apparatus which tracks the subject at a second tracking sensitivity different from the first tracking sensitivity; and output an image selected from the first image and the second image according to a movement speed of the subject, and wherein the first tracking sensitivity is determined from at least one of:

(a) a first interval for calculating a movement amount and the movement speed of the subject;

(b) a first threshold value concerning the movement amount of the subject; and (c) a first speed coefficient concerning a first control speed of control concerning a first image capturing direction of the first image capturing apparatus, wherein the at least one processor further executes the stored instructions to change the first tracking sensitivity and the second tracking sensitivity, wherein the second tracking sensitivity is determined from at least one of:

(d) a second interval for calculating the movement amount and the movement speed of the subject;

(e) a second threshold value concerning the movement amount of the subject; and (f) a second speed coefficient concerning a second control speed of control concerning a second image capturing direction of the second image capturing apparatus, and wherein, in a case where there is a difference between the movement amount of the subject in the first image and the movement amount of the subject in the second image, the one of the first and second image capturing apparatuses which has captured the image in which the movement amount of the subject in the captured image is larger is set to the first tracking sensitivity and the one of the first and second image capturing apparatuses which has captured the image in which the movement amount of the subject in the captured image is smaller is set to the second tracking sensitivity.

2. The information processing apparatus according to claim 1, wherein the first tracking sensitivity is higher than the second tracking sensitivity, and wherein, in a case where the movement speed of the subject is a speed which allows tracking of the subject at the second tracking sensitivity, the second image is output, and, in a case where the movement speed of the subject is a speed which does not allow tracking of the subject at the second tracking sensitivity, the first image is output.

3. The information processing apparatus according to claim 1, wherein each of the first image capturing apparatus and the second image capturing apparatus is configured to mutually acquire information representing a position and motion of the subject in the captured image, and wherein a difference in movement amount of the subject is acquired based on the information representing a position and motion of the subject mutually acquired by the first image capturing apparatus and the second image capturing apparatus.

4. The information processing apparatus according to claim 3, wherein a difference in movement amount of the subject when detecting that the subject has started to move after stopping a movement thereof is acquired based on the information representing a position and motion of the subject mutually acquired by the first image capturing apparatus and the second image capturing apparatus.

5. The information processing apparatus according to claim 1, wherein the first tracking sensitivity is a maximum sensitivity capable of tracking the subject.

6. An information processing method comprising:

acquiring a first image captured by a first image capturing apparatus which tracks a subject at a first tracking sensitivity;

acquiring a second image captured by a second image capturing apparatus which tracks the subject at a second tracking sensitivity different from the first tracking sensitivity; and outputting an image selected from the first image and the second image according to a movement speed of the subject, and wherein the first tracking sensitivity is determined from at least one of:

(a) a first interval for calculating a movement amount and the movement speed of the subject;

(b) a first threshold value concerning the movement amount of the subject; and (c) a first speed coefficient concerning a first control speed of control concerning a first image capturing direction of the first image capturing apparatus, wherein the second tracking sensitivity is determined from at least one of:

(d) a second interval for calculating the movement amount and the movement speed of the subject;

(e) a second threshold value concerning the movement amount of the subject; and (f) a second speed coefficient concerning a second control speed of control concerning a second image capturing direction of the second image capturing apparatus, and wherein, in a case where there is a difference between the movement amount of the subject in the first image and the movement amount of the subject in the second image, an image capturing apparatus which has captured an image in which the movement amount of the subject in the captured image is larger is set to the first tracking sensitivity and an image capturing apparatus which has captured an image in which the movement amount of the subject in the captured image is smaller is set to the second tracking sensitivity.

7. A non-transitory computer-readable storage medium storing computer-executable instructions that, when executed by at least one processor, causes the at least one processor to perform an information processing method comprising:

acquiring a first image captured by a first image capturing apparatus which tracks a subject at a first tracking sensitivity;

acquiring a second image captured by a second image capturing apparatus which tracks the subject at a second tracking sensitivity different from the first tracking sensitivity; and outputting an image selected from the first image and the second image according to a movement speed of the subject, and wherein the first tracking sensitivity is determined from at least one of:

(a) a first interval for calculating a movement amount and the movement speed of the subject;

(b) a first threshold value concerning the movement amount of the subject; and (c) a first speed coefficient concerning a first control speed of control concerning a first image capturing direction of the first image capturing apparatus, wherein the second tracking sensitivity is determined from at least one of:

(d) a second interval for calculating the movement amount and the movement speed of the subject;

(e) a second threshold value concerning the movement amount of the subject; and (f) a second speed coefficient concerning a second control speed of control concerning a second image capturing direction of the second image capturing apparatus, and wherein, in a case where there is a difference between the movement amount of the subject in the first image and the movement amount of the subject in the second image, an image capturing apparatus which has captured an image in which the movement amount of the subject in the captured image is larger is set to the first tracking sensitivity and an image capturing apparatus which has captured an image in which the movement amount of the subject in the captured image is smaller is set to the second tracking sensitivity.

8. The information processing apparatus according to claim 1, wherein the at least one processor further executes the stored instructions to acquire information regarding a position and motion of the subject from at least one of the first image capturing apparatus and the second image capturing apparatus, and wherein one of the first image and the second image is output based on the acquired information regarding the position and motion of the subject.

9. The information processing apparatus according to claim 1, wherein information regarding a position and motion of the subject is appended to at least one of the first image and the second image.

* * * * *